United States Patent
Liu et al.

(10) Patent No.: US 10,230,983 B2
(45) Date of Patent: Mar. 12, 2019

(54) SIMPLIFICATION OF DELTA DC RESIDUAL CODING IN 3D VIDEO CODING

(71) Applicants: QUALCOMM Incorporated, San Diego, CA (US); Hongbin Liu, Beijing (CN); Ying Chen, San Diego, CA (US); Li Zhang, San Diego, CA (US)

(72) Inventors: Hongbin Liu, Beijing (CN); Ying Chen, San Diego, CA (US); Li Zhang, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 166 days.

(21) Appl. No.: 15/108,759

(22) PCT Filed: Dec. 30, 2013

(86) PCT No.: PCT/CN2013/001662
§ 371 (c)(1),
(2) Date: Jun. 28, 2016

(87) PCT Pub. No.: WO2015/100514
PCT Pub. Date: Jul. 9, 2015

(65) Prior Publication Data
US 2016/0330479 A1    Nov. 10, 2016

(51) Int. Cl.
*H04N 19/597* (2014.01)
*H04N 19/91* (2014.01)
(Continued)

(52) U.S. Cl.
CPC ........... *H04N 19/597* (2014.11); *H04N 19/13* (2014.11); *H04N 19/159* (2014.11);
(Continued)

(58) Field of Classification Search
CPC .... H04N 19/597; H04N 19/13; H04N 19/159; H04N 19/176; H04N 19/182; H04N 19/70; H04N 19/91
(Continued)

(56) References Cited

U.S. PATENT DOCUMENTS

| 2013/0272389 A1 | 10/2013 | Sze et al. |
| 2015/0049819 A1* | 2/2015 | Lee ........................ H04N 19/91 375/240.23 |

(Continued)

FOREIGN PATENT DOCUMENTS

| CN | 101340576 | 1/2009 |
| CN | 102447907 | 5/2012 |
| CN | 102065298 | 10/2012 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

(Continued)

*Primary Examiner* — William C Vaughn, Jr.
*Assistant Examiner* — Jae N Noh
(74) *Attorney, Agent, or Firm* — Shumaker & Sieffert, P.A.

(57) ABSTRACT

This disclosure describes techniques for simplifying delta DC residual coding in a 3D video coding process, such as 3D-HEVC. In some examples, the techniques may modify binarization and/or context modeling processes to reduce the complexity of entropy coding of one or more syntax elements used to represent delta DC residual values.

44 Claims, 7 Drawing Sheets

(51) Int. Cl.

| | |
|---|---|
| *H04N 19/159* | (2014.01) |
| *H04N 19/13* | (2014.01) |
| *H04N 19/182* | (2014.01) |
| *H04N 19/176* | (2014.01) |
| *H04N 19/70* | (2014.01) |

(52) U.S. Cl.
CPC ......... *H04N 19/176* (2014.11); *H04N 19/182* (2014.11); *H04N 19/70* (2014.11); *H04N 19/91* (2014.11)

(58) Field of Classification Search
USPC .................................................. 375/240.12
See application file for complete search history.

(56) References Cited

U.S. PATENT DOCUMENTS

| | | | | |
|---|---|---|---|---|
| 2015/0078443 | A1* | 3/2015 | Kolesnikov | ......... H03M 7/4075 375/240.03 |
| 2016/0073131 | A1* | 3/2016 | Heo | ..................... H04N 19/597 348/43 |
| 2016/0330456 | A1* | 11/2016 | Lasserre | ................ H04N 19/30 |

OTHER PUBLICATIONS

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (For FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Tech, et al., "3D-HEVC Draft Text 2," JCT-3V Meeting; Oct. 25-Nov. 1, 2013; (Joint Collaborative Team on Video Coding of ISO/IEC JTC1/SC29/WG11 and ITU-T SG.16); document No. JCT3V-F1001_v2, Dec. 5, 2013; 93 pp.

ITU-T H.223, Series H: Audiovisual and Multimedia Systems, Infrastructure of audiovisual services—Coding of moving video, Infrastructure of audiovisual services—Transmission multiplexing and synchronization, Multiplexing protocol for low bit rate multimedia communication, The International Telecommunication Union. Jul. 2001, 74 pp.

International Search Report and Written Opinion—PCT/CN2013/001662—ISA/EPO—dated Oct. 10, 2014 (10 pages).

International Preliminary Report on Patentability—PCT/CN2013/001662—ISA/EPO—dated Jul. 14, 2016 (5 pages).

Chen et al., "3D-CE5 related: Bin reduction for SDC residual coding," 6, JCT-3V Meeting; Oct. 25, 2013-Nov. 1, 2013; Geneva, CH (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-F0113-v1, Oct. 24, 2013 (Oct. 24, 2013), XP030131530, 6 pages.

Supplementary European Search Report—EP13900710—Search Authority—Munich—dated Jun. 30, 2017, 10 pp.

Zhao et al., "CE5 related: Unification of delta DC coding for depth intra modes," 6. JCT-3V Meeting; Oct. 25, 2013-Nov. 1, 2013; Geneva, CH (The Joint Collaborative Team on 3D Video Coding Extension Development of ISO/IEC JTC1/SC29/WG11 and ITU-T SG.16); URL: http://phenix.int-evry.fr/jct2/, No. JCT3V-F0132, Oct. 18, 2013 (Oct. 18, 2013), 8 pp. XP030131558, the whole document.

Tech G., et al.,"3D-HEVC Draft Text 2," 5. JCT-3V Meeting; Jul. 27, 2013-Aug. 2, 2013; Vienna, AT (The Joint Collaborative Team on 3D Video Coding Extension Development of ISO/IEC JTC1/SC29/WG11 and ITU-T SG.16); URL: http://phenix.int-evry.fr/jct2/, No. JCT3V-E1001-v3, Sep. 11, 2013 (Sep. 11, 2013), pp. 1-89, XP030131378.

Bross B., et al., "Proposed Editorial Improvements for High efficiency video coding (HEVC) Text Specification Draft 8 with Range Extensions," Joint Collaborative Team on Video Coding (JCT-VC) of ITU-T SG16 WP3 and ISO/IEC JTC1/SC29/WG11 11th Meeting: Shanghai, CN, Oct. 10-19, 2012, URL:http://phenix.it-sudparis.eu/jct/doc_end_user/documents/12_Geneva/wg11/JCTVC-L0182-v2.zip, Jan. 15, 2013, JCTVC-K0383, pp. 170-177.

Heo J., et al., "CE5: Fast depth lookup table application method to intra modes for depth data," Joint Collaborative Team on 3D Video Coding Extension Development of ITU-T SG 16 WP 3 and ISO/IEC JTC 1/SC 29/WG 11 6th Meeting: Geneva, CN, Oct. 25-Nov. 1, 2013, URL:http://phenix.it-sudparis.eu/jct2/doc_end_user/documents/6_Geneva/wg11/JCT3V-F0159-v1.zip, Oct. 18, 2013, JCT3V-F0159, pp. 1-10.

Heo J., et al.,"3D-CE6.h: Concatenate binarization for residual index coding," Joint Collaborative Team on 3D Video coding Extensions Development of ITU-T SG 16 WP 3 and ISO/IEC JTC 1/SC 29/WG 11 4th Meeting: Incheon, KR, Apr. 20-26, 2013, URL:http://phenix.it-sudparis.eu/jct2/doc_end_user/documents/4_Incheon/wg11/JCT3V-D0141-v2.zip, Apr. 17, 2013, JCT3V-D0141, pp. 1-11.

Sasai H., et al., "Modified MVD coding for CABAC," Joint Collaborative Team on Video Coding (JCT-VC) of ITU-T SG16 WP3 and ISO/IEC JTC1/SC29/WG11, 6th Meeting: Torino, IT, Jul. 14-22, 2011, pp. 1-6.

Sugimoto K., et al., "AHG5: Max exponential golomb code for reducing number of bins," Joint Collaborative Team on Video Coding (JCT-VC) of ITU-T SG 16 WP 3 and ISO/IEC JTC 1/SC 29/WG 11 10th Meeting: Stockholm, SE, Jul. 11-20, 2012, URL:http://

(56) References Cited

OTHER PUBLICATIONS phenix.it-sudparis.eu/jct/doc_end_user/documents/10_Stockholm/wg11/JCTVC-J0194-v2.zip, Jan. 12, 2013, JCTVC-J0194r1, pp. 1-12.

Tech et al., "3D-HEVC Draft Text 2," Document: JCT3V-F1001-v1, Joint collaborative Team on 3D Video Coding Extension Development of ITU-T SG 16 WP 3 and ISO/IEC JCT 1/SC 29/WG 11, 6th Meeting: Geneva, CH, Oct. 25-Nov. 1, 2013, 98 pp.

Yu, et al., "3D-CE3: Delta DCcoding for SDC and DMM modes," Document: JCT3V-H0131; Joint collaborative Team on 3D Video Coding Extension Development of ITU-T SG 16 WP 3 and ISO/IEC JCT 1/SC 29/WG 11, 8th Meeting: Valencia, ES, Mar. 29-Apr. 4, 2014, 5 pp.

Yu, et al., "3D-CE3: Delta DC coding for SDC and DMM modes," Document: JCT3V-G0124; Joint collaborative Team on 3D Video Coding Extension Development of ITU-T SG 16 WP 3 and ISO/IEC JCT 1/SC 29/WG 11, 8th Meeting; Valencia, ES, Mar. 29-Apr. 4, 2014, 5 pp.

Muller et al., "Common Test Conditions of 3DV Core Experiments," Jan. 11-17, 2014; ITU-T SG 16 WP 3 and ISO/IEC JTC 1/SC 29/WG 11, JCT3V-G1100, 7th Meeting: San Jose, US, Jan. 17, 2014, 7 pp.

Yu et al., "CE5 related: Delta DC coding for SDC and DMM modes," Joint Collaborative Team on 3D Video Coding Extensions of ITU-T SG 16 WP 3 and ISO/IEC JCT 1/SC 29/WG 11, 7th Meeting, San Jose, US; Jan. 11-17, 2014, document: JCT3V-G0124, Jan. 3, 2014, 8 pp.

\* cited by examiner

SIMPLIFICATION OF DELTA DC RESIDUAL CODING IN 3D VIDEO CODING

This application is a national stage entry under 35 U.S.C. § 371 of International Application No. PCT/CN2013/001662, filed Dec. 30, 2013.

TECHNICAL FIELD

This disclosure relates to video coding, and more particularly, to delta DC residual coding in a three-dimensional (3D) video coding process.

BACKGROUND

Digital video capabilities can be incorporated into a wide range of devices, including digital televisions, digital direct broadcast systems, wireless broadcast systems, tablet computers, smartphones, personal digital assistants (PDAs), laptop or desktop computers, digital cameras, digital recording devices, digital media players, video gaming devices, video game consoles, cellular or satellite radio telephones, video teleconferencing devices, set-top devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive and store digital video information more efficiently.

An encoder-decoder (codec) applies video compression techniques to perform spatial (intra-picture) prediction and/or temporal (inter-picture) prediction to reduce or remove redundancy inherent in video sequences. For block-based video coding, a video slice may be partitioned into video blocks, which may also be referred to as coded treeblocks (CTBs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures alternatively may be referred to as frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the spatial domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

A multi-view coding bitstream may be generated by encoding views, e.g., from multiple perspectives. Multiview coding may allow a decoder to select different views, or possibly render multiple views. In addition, some three-dimensional (3D) video techniques and standards that have been developed, or are under development, make use of multiview coding aspects. For example, in some 3D video coding processes, different views may be used to transmit left and right eye views to support 3D video. Other 3D video coding processes may use multiview-plus-depth coding. In a multiview-plus-depth coding process, such as a process defined by the 3D-HEVC extension to HEVC, a 3D video bitstream may contain multiple views that include not only texture view components, but also depth view components. For example, a given view may comprise a texture view component and a depth view component. The texture view and depth view components may be used to construct 3D video data.

SUMMARY

In general, this disclosure describes techniques for simplifying delta DC residual coding in a 3D video coding process, such as 3D-HEVC. The techniques may include the use of modified binarization and/or context modeling processes to reduce the complexity of entropy coding of one or more syntax elements used to represent delta DC residual values. The delta DC residual values may represent residual data for intra- and/or inter-predicted depth blocks generated in a 3D video coding process. In some examples, the techniques may reduce the number of bins that are coded using context models for a syntax element. Reducing the number of bins that are coded using context models may promote increased throughput in an entropy encoder/decoder.

In one example, the disclosure describes a method of video decoding, the method comprising receiving an encoded video bitstream, decoding bins from the bitstream for a syntax element that represents a delta DC residual value for a prediction unit (PU) of a depth coding unit (CU), wherein decoding comprises decoding no more than N leading bins for the syntax element using one or more context models, wherein N is less than a maximum possible number of the bins for the syntax element, and bypass decoding any remaining bins for the syntax element that were not decoded using one or more context models, generating the syntax element based on the decoded bins, and reconstructing the PU based at least in part on the delta DC residual value represented by the syntax element.

In another example, the disclosure describes a method for video encoding, the method comprising generating a syntax element that represents a delta DC residual value for a prediction unit (PU) of a depth coding unit (CU), binarizing the syntax element, encoding no more than N leading bins of the binarized syntax element using one or more context models, wherein N is less than a maximum possible number of the bins of the binarized syntax element, bypass encoding any remaining bins of the binarized syntax element that were not encoded using one or more context models, and signaling bits corresponding to the encoded bins in an encoded bitstream.

In another example, the disclosure describes a video coding device comprising a memory storing a coded video bitstream, wherein the bitstream codes a syntax element that represents a delta DC residual value for a prediction unit (PU) of a depth coding unit (CU), and one or more processors configured to code no more than N leading bins of the syntax element using one or more context models, wherein N is less than a maximum possible number of the bins, and bypass code any remaining bins of the syntax element that were not decoded using one or more context models.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
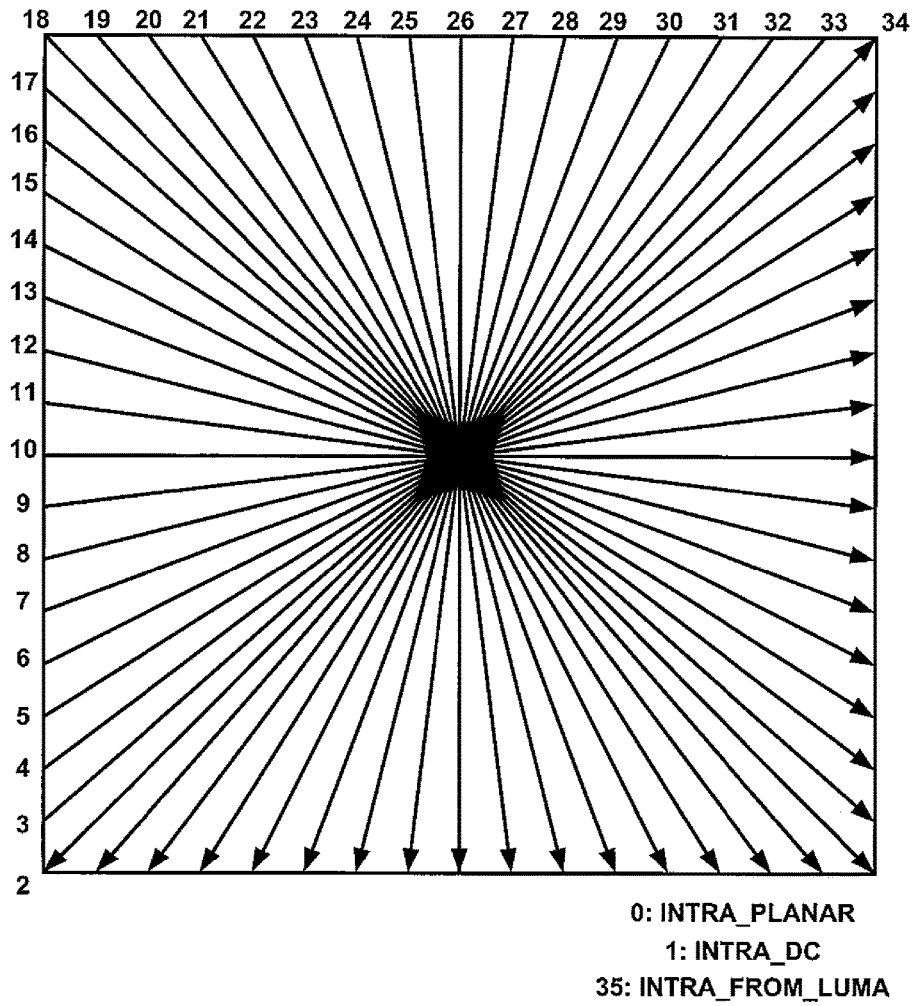
FIG. 1 is a diagram illustrating intra prediction modes used in high efficiency video coding (HEVC).

This disclosure describes techniques for simplifying DC residual coding for depth coding in a 3D video coding process, such as 3D-HEVC. DC residual coding also may be referred to as delta DC coding or delta DC residual coding. In some examples, the techniques described in this disclosure may improve binarization and/or context modeling processes related to delta DC coding. In particular, the techniques may modify binarization and/or context modeling processes to reduce the complexity of entropy coding of one or more syntax elements used to represent delta DC residual values. In this disclosure, the term "coding" may refer to encoding or decoding as performed, for example, by an encoder or decoder. Accordingly, to reduce complexity of entropy coding, the techniques described in this disclosure may be applied in an entropy encoding process and a corresponding entropy decoding process.

The delta DC residual values may represent, for example, residual data for intra- and/or inter-predicted depth blocks. The delta DC residual values may be generated, for example, by segment-wise DC coding (SDC) or depth map modeling (DMM) modes in a 3D video coding process, such as 3D-HEVC. A DC residual value may be referred to as a delta DC value. A depth coding unit (CU) may have one or more prediction units (PUs), and each PU may be partitioned into one or more partitions. A PU may be inter-coded or intra-coded, e.g., using HEVC intra modes, HEVC inter modes, or depth map modeling (DMM) modes.

In SDC or DMM, for example, the delta DC value may represent a difference between an average of pixel values of a partition of one or more partitions of a PU of a depth CU and an average of values of predicted samples of an inter- or intra-predicted partition, i.e., a partition that is inter- or intra-predicted for the PU partition. A PU may have a single partition or two or more partitions, depending on the mode. When SDC is used, each PU or partition has a single delta DC value that is neither transformed nor quantized, and there is no residual transform tree. SDC can be applied to HEVC intra and inter prediction mode and to DMM. To reconstruct a PU or partition that is coded with SDC mode, the single delta DC value for a PU or PU partition is added to each of the predicted pixels of the PU or partition.

DMM prediction modes also may use delta DC coding, and may be used with or without SDC. When DMM is used with SDC, only a DC residual value is used for each PU or PU partition, and no residual transform tree is generated. When DMM is used without SDC, a delta DC value is generated for each PU or PU partition, in addition to a regular residual transform tree that is generated for the PU. To reconstruct a PU or partition that is coded with DMM, but without SDC, the following procedure is performed. First, the prediction samples are generated for the PU or partition. Next, for each partition, the delta DC value for the partition is added to the prediction samples for the partition. Then, the residual values derived from the residual transform tree are added to those prediction samples to reconstruct the PU. If SDC is used with DMM, only the delta DC residual value is added to the prediction samples.

In some examples, the techniques of this disclosure may reduce the number of bins that are coded using context models for a syntax element representing a delta DC residual value. Reducing the number of bins that are coded using context models may promote increased throughput in an entropy encoder/decoder.

In this section, video coding standards and HEVC techniques related to this disclosure are reviewed. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

In addition, there is a new upcoming video coding standard, namely High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). A recent draft of the HEVC standard, JCTVC-L1003, Benjamin Bross, Woo-Jin Han, Jens-Ranier Ohm, Gary Sullivan, Ye-Kui Wang, Thomas Wiegand, "High Efficiency Video Coding (HEVC) text specification draft 10 (for FDIS & Last Call)," Joint Collaborative Team on Video Coding (JCT-VC) of ITU-T SG 16 WP 3 and ISO/IEC JTC 1/SC 29/WG 11, 12th Meeting: Geneva, C H, 14-23 Jan. 2013 ("HEVC WD 10"), is incorporated herein by reference in its entirety, and is available from the following link:
http://phenix.it-sudparis.eu/jct/doc_end_user/documents/12_Geneva/wg11/JCTVC-L1003-v34.zip FIG. 1 is a diagram illustrating intra prediction modes used in HEVC. FIG. 1 generally illustrates the prediction directions associated with various directional intra-prediction modes available for intra-coding in HEVC. In the current HEVC, e.g., as described in HEVC WD 10, for the luma component of each Prediction Unit (PU), an intra prediction method is utilized with 33 directional (angular) prediction modes (indexed from 2 to 34), DC mode (indexed with 1) and Planar mode (indexed with 0), as shown in FIG. 1.

In the Planar mode (indexed with 0), prediction is performed using a so-called "plane" function to determine predictor values for each of the pixels within a block of video data, e.g., PU. According to the DC mode (indexed with 1), prediction is performed using an averaging of pixel values within the block to determine predictor values for each of the pixels within the block. According to a directional prediction mode, prediction is performed based on a neighboring block's reconstructed pixels along a particular direction (as indicated by the mode). In general, the tail end of the arrows shown in FIG. 1 represents a relative one of neighboring pixels from which a value is retrieved, while the head of the arrows represents the direction in which the retrieved value is propagated to form a predictive block.

For HEVC intra prediction modes, a video encoder and/or video decoder generates a pixel specific predictor value for each pixel in the PU using the various modes discussed above, e.g., by using neighboring samples of the PU for modes 2 to 34. A video encoder determines residual values for the video block based on the differences between the actual depth values and the predictor values for the pixels of the block, and provides the residual values to a video decoder. According to HEVC WD 10, a video encoder transforms the residual values and quantizes the transform coefficients, and may also entropy encode the quantized transform coefficients. A video decoder (e.g., after entropy decoding, inverse quantizing, and inverse transforming) determines reconstructed values for the pixels of the block by adding the residual values to the predictor values. Further details regarding HEVC intra prediction modes are specified in HEVC WD 10.

Entropy coding process used in HEVC will now be described, including the context adaptive binary arithmetic coding (CABAC) parsing process used in HEVC. This disclosure describes techniques that may modify binarization and/or context modeling processes used in CABAC entropy coding of syntax elements related to delta DC residual value coding. In general, the inputs to the CABAC parsing process are remaining bits from the coded bitstream, a request for a value of a syntax element, and the values of previously decoded syntax elements, while the output of this process is the value of one specific syntax element.

The main steps for the coding process include:
1. Binarization
2. Context modeling
3. Binary arithmetic coding For binarization, a CABAC entropy coder maps a non-binary valued syntax element to a binary sequence, referred to as a bin string. If the syntax element is already binary valued, binarization is not necessary and can be bypassed. Each bin in the bin string represents a binary decision. The CABAC entropy coder then codes each bin in the bin string, either using a regular coding engine of the CABAC coder, where a context model is selected, or a bypass coding engine of the CABAC coder, where context model selection is not required.

In the regular (i.e., context-adaptive) coding mode, the CABAC entropy coder includes a context modeler that performs context modeling prior to the arithmetic coding process for each bin. The regular coding engine of the CABAC entropy coder performs context modeling, by which a probability model is selected for each bin. The probability model may be selected in the CABAC entropy coder such that the context selection depends on previously coded binary syntax elements or bins of syntax elements. After context model selection, the regular coding engine of the CABAC entropy coder receives the bin and probability model selected for the bin. The CABAC regular coding engine then applies binary arithmetic encoding to the pertinent bin using the context model, and subsequently updates the context model. In particular, the bin value may be fed back to the context modeler to update the context model.

Alternatively, the entropy coder selects a bypass coding mode for entropy coding selected bins. A bypass coding engine of the CABAC entropy coder uses a simplified arithmetic coder, without the use of explicitly assigned context models, to code bins. The bypass coding engine is not context-adaptive. That is, in the bypass coding engine, bins are not context coded using an estimated probability obtained from a context model. Instead, bypass coded bins may be coded with a fixed probability model. For example, the bypass coding engine may assume an equal probability of 0.5, and does not require selection of a context for coding. Hence, some bins may be coded using the regular binary arithmetic coding engine with the use of context models (i.e., context coded in the regular coding engine), while other bins may be coded using a bypass coding without the use of context models (i.e., bypass coded in the bypass coding engine).

The regular coding engine or bypass coding engine of a CABAC entropy encoder, as applicable, arithmetically codes the bins for a syntax element to generate coded bits that form a bitstream. The regular coding engine or bypass coding engine of a CABAC entropy decoder, as applicable, decodes bits in the bitstream to generate bins, and decodes one or more bins to generate syntax element. In some examples, bypass coding may provide increased throughput, and may allow multiple bins to be coded in the same cycle. Accordingly, use of the CABAC bypass coding engine may desirable for increased computational throughput, whereas use of the CABAC regular coding engine may be desirable for high coding efficiency.

A variety of binarization methods that may be used in a CABAC entropy coder, such as the HEVC CABAC coder, will now be described. In HEVC, the basic binarization methods include:

1. FL (fixed length) binarization process. The FL binarization process uses a fixedLength bit unsigned integer bin string of the syntax element value, where fixedLength=Ceil(Log 2(cMax+1)) and cMax is the maximum value of the syntax element value.

2. k-th order exponential Golomb ("Exp-Golomb" or "EGk") binarization process. In the EGk process uses, the binary value X at the end of the bin string may be determined as follows:

```
absV = Abs( synVal )
stopLoop = 0
do {
    if( absV >= ( 1 << k ) ) {
        put( 1 )
        absV = absV − ( 1 << k )
        k++
    } else {
        put( 0 )
        while( k−− )
            put( ( absV >> k) & 1 )
        stopLoop = 1
    }
} while( !stopLoop )
```

An example of the EG0 binarization process, i.e., with k=0, is shown in Table 1 below:

TABLE 1

Bin string of the EG0 binarization

| Val | Bin string | | | | | |
|---|---|---|---|---|---|---|
| 0 | 0 | | | | | |
| 1 | 1 | 0 | 0 | | | |
| 2 | 1 | 0 | 1 | | | |
| 3 | 1 | 1 | 0 | 0 | 0 | |
| 4 | 1 | 1 | 0 | 0 | 1 | |
| 5 | 1 | 1 | 0 | 1 | 0 | |
| ... | | | | | | |
| binIdx | 0 | 1 | 2 | 3 | 4 | 5 |

3. TR (truncated Rice) binarization process. In the TR binarization process, a TR bin string is a concatenation of a prefix bin string and, when present, a suffix bin string. Detailed information concerning the TR binarization process can be found in sub-clause 9.3.3.2 in the HEVC specification, e.g., in HEVC WD 10.

4. Other binarization methods are specified for certain syntax elements, such as part_mode, intra_chroma_pred_mode, inter_pred_idc, cu_qp_delta_abs and coeff_abs_level_remaining.

Here, the binarization method of cu_qp_delta_abs is described in more detail, for purposes of example. The binarization of the syntax element cu_qp_delta_abs is a concatenation of a prefix bin (with TR) string and (when present) a suffix bin string (with EGk). For the derivation of the prefix bin string, the following applies:

The prefix value of cu_qp_delta_abs, prefixVal, is derived as follows:

prefixVal=Min(*cu_qp*_delta_abs,5)

The prefix bin string is specified by invoking the TR binarization process for prefixVal with cMax=5 and cRiceParam=0.

When prefixVal is greater than 4, the suffix bin string is present and it is derived as follows:

The suffix value of cu_qp_delta_abs, suffixVal, is derived as follows:

suffixVal=*cu_qp*_delta_abs−5

The suffix bin string is specified by invoking the EG0 binarization process.

Worst case analysis for the syntax coding of an HEVC coding unit is discussed below with reference to Table 2. Table 2 shows the syntax coding of an HEVC coding unit. The variable ctxInc is specified by the corresponding entry in Table 2 and when more than one value is listed in Table 2 for a binIdx, the assignment process for ctxInc for that binIdx is further specified in the context modeling process. From Table 2, it is seen that last_sig_coeff_x_prefix and last_sig_coeff_y_prefix are the syntax elements having the longest context coded bins. In particular, the number of context coded bins for last_sig_coeff_x_prefix and last_sig_coeff_y_prefix is 9.

TABLE 2

Assignment of ctxInc to syntax elements with context coded bins

| Syntax element | binIdx | | | | | |
|---|---|---|---|---|---|---|
| | 0 | 1 | 2 | 3 | 4 | >=5 |
| end_of_slice_segment_flag | terminate | na | na | na | na | na |
| end_of_sub_stream_one_bit | terminate | na | na | na | na | na |
| sao_merge_left_flag | 0 | na | na | na | na | na |
| sao_merge_up_flag | 0 | na | na | na | na | na |
| sao_type_idx_luma | 0 | bypass | na | na | na | na |
| sao_type_idx_chroma | 0 | bypass | na | na | na | na |
| sao_offset_abs[ ][ ][ ][ ] | bypass | bypass | bypass | bypass | bypass | bypass |
| sao_offset_sign[ ][ ][ ] | bypass | na | na | na | na | na |
| sao_band_position[ ][ ][ ] | bypass | bypass | bypass | bypass | bypass | bypass |
| sao_eo_class_luma | bypass | bypass | bypass | na | na | na |
| sao_eo_class_chroma | bypass | bypass | bypass | na | na | na |
| split_cu_flag[ ][ ] | 0,1,2 (subclause 9.3.4.2.2) | na | na | na | na | na |
| cu_transquant_bypass_flag | 0 | na | na | na | na | na |
| cu_skip_flag | 0,1,2 (subclause 9.3.4.2.2) | na | na | na | na | na |
| pred_mode_flag | 0 | na | na | na | na | na |
| part_mode log2CbSize == MinCbLog2SizeY | 0 | 1 | 2 | bypass | na | na |
| part_mode log2CbSize > MinCbLog2SizeY | 0 | 1 | 3 | bypass | na | na |
| pcm_flag[ ][ ] | terminate | na | na | na | na | na |
| prev_intra_luma_pred_flag[ ][ ] | 0 | na | na | na | na | na |
| mpm_idx[ ][ ] | bypass | bypass | na | na | na | na |
| rem_intra_luma_pred_mode[ ][ ] | bypass | bypass | bypass | bypass | bypass | bypass |
| intra_chroma_pred_mode[ ][ ] | 0 | bypass | bypass | na | na | na |
| rqt_root_cbf | 0 | na | na | na | na | na |
| merge_flag[ ][ ] | 0 | na | na | na | na | na |
| merge_idx[ ][ ] | 0 | bypass | bypass | bypass | na | na |
| inter_pred_idc[ x0 ][ y0 ] | (nPbW + nPbH) != 12 ? CtDepth[ x0 ][ y0 ] : 4 | 4 | na | na | na | na |
| ref_idx_l0[ ][ ] | 0 | 1 | bypass | bypass | bypass | bypass |
| ref_idx_l1[ ][ ] | 0 | 1 | bypass | bypass | bypass | bypass |
| mvp_l0_flag[ ][ ] | 0 | na | na | na | na | na |
| mvp_l1_flag[ ][ ] | 0 | na | na | na | na | na |
| split_transform_flag[ ][ ][ ] | 5 − log2TrafoSize | na | na | na | na | na |
| cbf_cb[ ][ ][ ] | trafoDepth | na | na | na | na | na |
| cbf_cr[ ][ ][ ] | trafoDepth | na | na | na | na | na |

TABLE 2-continued

Assignment of ctxInc to syntax elements with context coded bins

| Syntax element | binIdx 0 | 1 | 2 | 3 | 4 | >=5 |
|---|---|---|---|---|---|---|
| cbf_luma[ ][ ][ ] | trafoDepth == 0 ? 1 : 0 | na | na | na | na | na |
| abs_mvd_greater0_flag[ ] | 0 | na | na | na | na | na |
| abs_mvd_greater1_flag[ ] | 0 | na | na | na | na | na |
| abs_mvd_minus2[ ] | bypass | bypass | bypass | bypass | bypass | bypass |
| mvd_sign_flag[ ] | bypass | na | na | na | na | na |
| cu_qp_delta_abs | 0 | 1 | 1 | 1 | 1 | bypass |
| cu_qp_delta_sign_flag | bypass | na | na | na | na | na |
| transform_skip_flag[ ][ ][ ] | 0 | na | na | na | na | na |
| last_sig_coeff_x_prefix | 0 . . . 17 (subclause 9.3.4.2.3) | | | | | |
| last_sig_coeff_y_prefix | 0 . . . 17 (subclause 9.3.4.2.3) | | | | | |
| last_sig_coeff_x_suffix | bypass | bypass | bypass | bypass | bypass | bypass |
| last_sig_coeff_y_suffix | bypass | bypass | bypass | bypass | bypass | bypass |
| coded_sub_block_flag[ ][ ] | 0 . . . 3 (subclause 9.3.4.2.4) | na | na | na | na | na |
| sig_coeff_flag[ ][ ] | 0 . . . 41 (subclause 9.3.4.2.5) | na | na | na | na | na |
| coeff_abs_level_greater1_flag[ ] | 0 . . . 23 (subclause 9.3.4.2.6) | na | na | na | na | na |
| coeff_abs_level_greater2_flag[ ] | 0 . . . 5 (subclause 9.3.4.2.7) | na | na | na | na | na |
| coeff_abs_level_remaining[ ] | bypass | bypass | bypass | bypass | bypass | bypass |
| coeff_sign_flag[ ] | bypass | na | na | na | na | na |

In Table 2 above, references to subclauses refer to corresponding subclauses in HEVC WD 10.

In JCT-3V, two HEVC extensions, the multiview extension (MV-HEVC) and 3D video extension (3D-HEVC) are being developed. A recent version of the reference software, "3D-HTM version 9.0," for 3D-HEVC is incorporated herein by reference in its entirety, and can be downloaded from the following link:
[3D-HTM version 9.0]: https://hevc.hhi.fraunhofer.de/svn/svn_3DVCSoftware/tags/HTM-9.0/

A recent draft of 3D-HEVC is presented in JCTVC-F1001-v2, Gerhard Tech, Krzysztof Wegner, Ying Chen, and Sehoon Yea, "3D-HEVC Draft Text 2," Joint Collaborative Team on 3D Video Coding Extension Development of ITU-T SG 16 WP 3 and ISO/IEC JTC 1/SC 29/WG 11, 6th Meeting: Geneva, C H, 25 Oct.-1 Nov. 2013 (referred to hereinafter as "F1001" or "3D-HEVC WD"), is incorporated herein by reference in its entirety, and is available from the following link:
http://phenix.it-sudparis.eu/jct2/doc_end_user/documents/6_Geneva/wg11/JCT3V-F1001-v2.zip In 3D-HEVC, as defined in the 3D-HEVC WD referenced above, each access unit contains multiple pictures, and each of the pictures in each view has a unique view identification (id), or view order index. However, the depth picture and texture picture of the same view may have different layer ids.

Depth coding in 3D video coding will now be described. 3D video data is represented using the multiview video plus depth format, in which captured views (texture) are associated with corresponding depth maps. In 3D video coding, textures and depth maps are coded and multiplexed into a 3D video bitstream. Depth maps are coded as a grayscale video where the luma samples represent the depth values, and conventional intra- and inter-coding methods can be applied for depth map coding.

Depth maps may be characterized by sharp edges and constant areas. Due to the different statistics of depth map samples, different coding schemes are designed for depth maps based on a 2D video codec. In a multiview plus depth coding process, a view may include a texture component and a depth component. Depth coding units (CU's) in the depth component may be inter-coded or intra-coded. The depth CU's may be divided into one or more PU's, and the PU's may be divided into one or more partitions.

As described in further detail in this disclosure, the partitions may be intra-predicted or inter-predicted, and a depth residual may be coded using, in some examples, a segment-wise DC residual coding (SDC) mode or a DMM coding mode. In SDC or DMM, a residual representing a difference between a coded PU partition and an intra- or inter-coded PU partition may be coded as a DC residual value. In particular, in SDC, the DC residual value may be a single value for an entire PU partition. DMM may be used with or without SDC. When DMM is used with SDC, the DC residual value may be a single value for an entire PU partition. When DMM is used without SDC, the DC residual value may be coded in addition to a regular residual transform tree. In either case, the delta DC value may represent a difference between an average of pixel values of the coded PU partition and an average of predicted samples of the inter- or intra-predicted partition.

Figure 2:
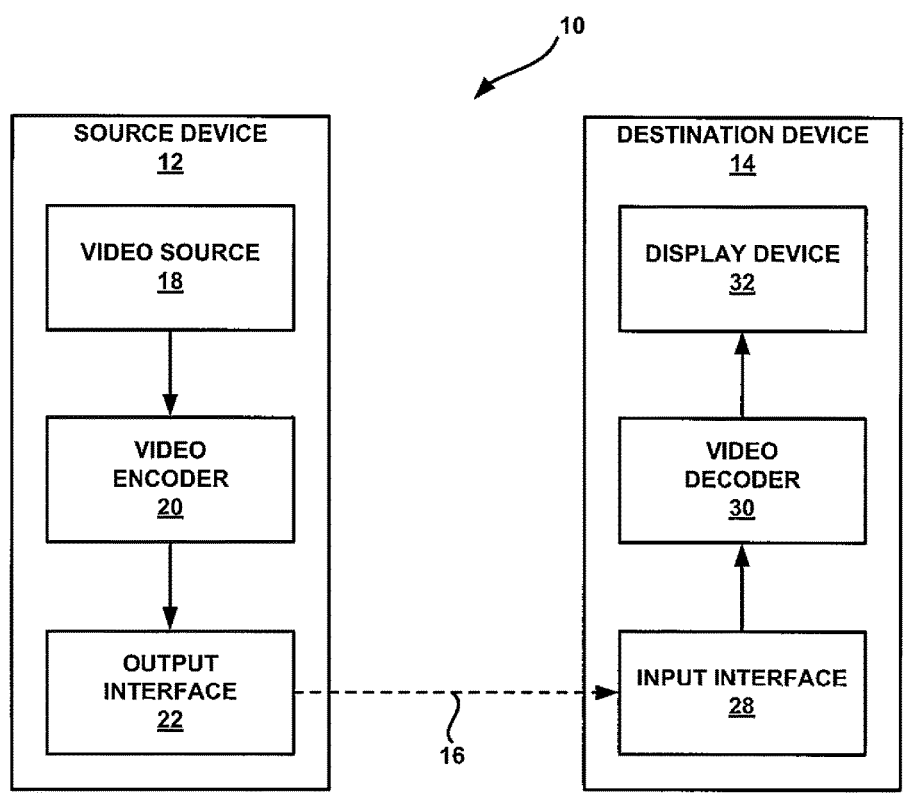
FIG. 2 is a block diagram illustrating an example video coding system that may utilize the techniques of this disclosure.

FIG. 2 is a block diagram illustrating an example video encoding and decoding system 10 that may be configured to utilize various techniques of this disclosure, such as the use of modified binarization and/or context modeling processes to reduce the complexity of entropy coding of one or more syntax elements used to represent delta DC residual values, in a 3D coding process, such as 3D-HEVC. In some examples, video encoder 20 and/or video decoder 30 of system 10 may be configured to perform entropy coding of such syntax elements with a reduced number of bins that are coded using context models. Reducing the number of bins that are coded using context models may promote increased throughput in an entropy encoder/decoder in some cases.

In some examples, video encoder 20 and video decoder 30 may be configured to code no more than N leading bins for a syntax element representing a delta DC residual value using one or more context models, wherein N is less than a maximum possible number of the bins for the binarized syntax element, and bypass code remaining bins, if any, for the syntax element that were not decoded using one or more context models. For example, video encoder 20 and video decoder 30 may be configured to use a regular coding engine of a CABAC entropy coder to encode the no more than N leading bins for the delta DC syntax element, and use a bypass coding engine of the CABAC entropy coder to encode any remaining bins for the delta DC syntax element.

As shown in FIG. 2, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium, such as a transmission channel, to enable source device 12 to transmit encoded video data directly to destination device 14 in real-time.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a computer-readable storage medium, such as a non-transitory computer-readable storage medium, i.e., a data storage device. Similarly, encoded data may be accessed from the storage device by input interface. The storage device may include any of a variety of distributed or locally accessed non-transitory data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure may be applied to video coding in support of any of a variety of wired or wireless multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 2, source device 12 includes video source 18, video encoder 20, and output interface 22. Destination device 14 includes input interface 28, video decoder 30, and display device 32. In accordance with this disclosure, video encoder 20 of source device 12 may be configured to apply techniques for delta DC coding for depth coding in a 3D video coding process, such as 3D-HEVC. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 2 is merely one example. Techniques described in this disclosure may be performed by a digital video encoding and/or decoding device. Although generally the techniques of this disclosure are performed by a video encoder 20 and/or video decoder 30, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer generated video. In some cases, if video source 18 is a video camera, source device 12 and destination device 14 may form so-called smart phones, tablet computers or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or data storage media (that is, non-transitory storage media). In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers or in payloads of various encoded portions of video data. In some cases, such syntax elements may be encoded and stored (e.g., stored to computer-readable medium 16) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, a projection device, or another type of display device.

Although not shown in FIG. 2, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, as one example, or other protocols such as the user datagram protocol (UDP).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Video encoder 20 and video decoder 30 may operate according to a video coding standard, such as the HEVC standard and, more particularly, the 3D-HEVC extension of the HEVC standard, as referenced in this disclosure, e.g., by document F1001 or 3D-HEVC WD. HEVC presumes several additional capabilities of video coding devices relative to devices configured to perform coding according to other processes, such as, e.g., ITU-T H.264/AVC. For example, whereas H.264 provides nine intra-prediction encoding modes, the HM may provide as many as thirty-five intra-prediction encoding modes.

Some basic aspects of HEVC will now be discussed. In general, HEVC specifies that a video picture (or "frame") may be divided into a sequence of largest coding units referred to as coding tree units (CTUs). A CTU includes corresponding luma and chroma components, referred to as coded tree blocks (CTB), e.g., luma CTB and chroma CTBs, including luma and chroma samples, respectively. Syntax data within a bitstream may define a size for the CTU, which is a largest coding unit in terms of the number of pixels. A slice may be a coded portion of a picture, and may include a number of consecutive CTBs in coding order. A picture may be partitioned into one or more slices. Each CTB may be split into coding units (CUs) according to a quadtree partitioning structure. In general, a quadtree data structure includes one node per CU, with a root node corresponding to the CTB. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. Four sub-CUs of a leaf-CU may also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU in HEVC has a similar purpose as a macroblock of the H.264 standard, except that a CU does not have a size distinction. For example, a CTB may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a CTB may be split, referred to as a maximum CU depth, and may also define a minimum size of the coding nodes. Accordingly, in some examples, a bitstream may also define a smallest coding unit.

A CU includes a coding node and prediction units (PUs) and transform units (TUs) associated with the coding node. This disclosure may use the term "block" to refer to any of a CU, prediction unit (PU), transform unit (TU), or partition thereof, in the context of HEVC, or similar data structures in the context of other standards. A size of the CU corresponds to a size of the coding node. The size of the CU may range from 8×8 pixels up to the size of the CTB with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape, or include partitions that are non-rectangular in shape, in the case of depth coding as described in this disclosure. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned CTB, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving reference samples for the PU. The reference samples may be pixels from a reference block. In some examples, the reference samples may be obtained from a reference block, or generated, e.g., by interpolation or other techniques. A PU also includes data related to prediction. For example, when the PU is intra-mode encoded, data for the PU may be included in a residual quadtree (RQT), which may include data describing an intra-prediction mode for a TU corresponding to the PU.

As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., RefPicList 0, RefPicList 1) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a CTB. TUs of the RQT that are not split are referred to as leaf-TUs. In general, this disclosure uses the terms CU and TU to refer to a leaf-CU and leaf-TU, respectively, unless noted otherwise.

A video sequence typically includes a series of pictures. As described herein, "picture" and "frame" may be used interchangeably. That is, a picture containing video data may be referred to as a video frame, or simply a "frame." A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, HEVC supports prediction in various PU sizes. Assuming that the size of a particular CU is 2N×2N, HEVC supports intra prediction in PU sizes of 2N×2N or N×N, and inter prediction in symmetric PU sizes of 2N×2N, 2N×N, N×2N, or N×N. A PU having a size of 2N×2N represents an undivided CU, as it is the same size as the CU in which it resides. In other words, a 2N×2N PU is the same size as its CU. HEVC supports asymmetric partitioning for inter prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom. For depth coding, the 3D-HEVC WD further supports partitioning of PU's according to depth modeling modes (DMMs), including non-rectangular partitions, as will be described.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra predictive or inter predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m. For depth coding, the 3D-HEVC WD further supports segment-wise DC coding of residual data and DMM coding, where delta DC values represent residual values for PU partitions. Unlike regular HEVC residual values, delta DC residual values may not be transformed or quantized.

Following quantization, video encoder 20 may scan the quantized transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive binary arithmetic coding (CABAC), as used in HEVC. Examples of other entropy coding processes include context-adaptive variable length coding (CAVLC), syntax-based context-adaptive binary arithmetic coding (SBAC), and Probability Interval Partitioning Entropy (PIPE) coding. Again, in HEVC, CABAC is used. Video encoder 20 may also entropy encode syntax elements associated with encoded video data for use by video decoder 30 in decoding video data.

Video encoder 20 may further send syntax data, such as block-based syntax data, picture-based syntax data, and GOP-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video encoder 20 and/or video decoder 30 may perform intra-picture prediction coding of depth data and inter-prediction coding of depth data. In addition, in accordance with examples of this disclosure, video encoder 20 and/or video decoder 30 may use SDC to code residual data resulting from depth intra prediction coding of video data and/or depth inter prediction coding of video data, e.g., according to any of a variety of examples, as will be described. In some examples, video encoder 20 and/or video decoder 30 may use DMM, with or without SDC, to generate residual data resulting from depth intra prediction. The residual data generated using SDC or DMM may include a delta DC residual value.

In HEVC, assuming that the size of a coding unit (CU) is 2N×2N, video encoder 20 and video decoder 30 may support various prediction unit (PU) sizes of 2N×2N or N×N for intra-prediction, and symmetric PU sizes of 2N×2N, 2N×N, N×2N, N×N, or similar sizes for inter-prediction. A video encoder and video decoder may also support asymmetric partitioning for PU sizes of 2N×nU, 2N×nD, nL×2N, and nR×2N for inter-prediction. For depth coding as provided in 3D-HEVC, a video encoder and video decoder may be configured to support a variety of different depth coding modes for intra prediction and/or inter prediction, including various depth modeling modes (DMMs), as described in this disclosure.

Video data coded using 3D video coding techniques may be rendered and displayed to produce a three-dimensional effect. As one example, two images of different views (i.e., corresponding to two camera perspectives having slightly different horizontal positions) may be displayed substantially simultaneously such that one image is seen by a viewer's left eye, and the other image is seen by the viewer's right eye.

A 3D effect may be achieved using, for example, stereoscopic displays or autostereoscopic displays. Stereoscopic displays may be used in conjunction with eyewear that filters the two images accordingly. For example, passive glasses may filter the images using polarized lenses, or different colored lenses, or other optical filtering techniques, to ensure that the proper eye views the proper image. Active glasses, as another example, may rapidly shutter alternate lenses in coordination with the stereoscopic display, which may alternate between displaying the left eye image and the right eye image. Autostereoscopic displays display the two images in such a way that no glasses are needed. For example, autostereoscopic displays may include mirrors or prisms that are configured to cause each image to be projected into a viewer's appropriate eyes.

The techniques of this disclosure relate to techniques for coding 3D video data by coding depth data to support 3D video. In general, the term "texture" is used to describe luminance (that is, brightness or "luma") values of an image and chrominance (that is, color or "chroma") values of the image. In some examples, a texture image may include one set of luminance data (Y) and two sets of chrominance data for blue hues (Cb) and red hues (Cr). In certain chroma formats, such as 4:2:2 or 4:2:0, the chroma data is downsampled relative to the luma data. That is, the spatial resolution of chrominance pixels may be lower than the spatial resolution of corresponding luminance pixels, e.g., one-half or one-quarter of the luminance resolution.

Depth data generally describes depth values for corresponding texture data. For example, a depth image may include a set of depth pixels (or depth values) that each describes depth, e.g., in a depth component of a view, for corresponding texture data, e.g., in a texture component of the view. Each pixel may have one or more texture values (e.g., luminance and chrominance), and may also have one or more depth values. A texture picture and a depth map may, but need not, have the same spatial resolution. For instance, the depth map may include more or fewer pixels than the corresponding texture picture. The depth data may be used to determine horizontal disparity for the corresponding texture data, and in some cases, vertical disparity may also be used.

A device that receives the texture and depth data may display a first texture image for one view (e.g., a left eye view) and use the depth data to modify the first texture image to generate a second texture image for the other view (e.g., a right eye view) by offsetting pixel values of the first image by the horizontal disparity values determined based on the depth values. In general, horizontal disparity (or simply "disparity") describes the horizontal spatial offset of a pixel in a first view to a corresponding pixel in the right view, where the two pixels correspond to the same portion of the same object as represented in the two views.

In still other examples, depth data may be defined for pixels in a z-dimension perpendicular to the image plane, such that a depth associated with a given pixel is defined relative to a zero disparity plane defined for the image. Such depth may be used to create horizontal disparity for displaying the pixel, such that the pixel is displayed differently for the left and right eyes, depending on the z-dimension depth value of the pixel relative to the zero disparity plane. The zero disparity plane may change for different portions of a video sequence, and the amount of depth relative to the zero-disparity plane may also change.

Pixels located on the zero disparity plane may be defined similarly for the left and right eyes. Pixels located in front of the zero disparity plane may be displayed in different locations for the left and right eye (e.g., with horizontal disparity) so as to create a perception that the pixel appears to come out of the image in the z-direction perpendicular to the image plane. Pixels located behind the zero disparity plane may be displayed with a slight blur, to slight perception of depth, or may be displayed in different locations for the left and right eye (e.g., with horizontal disparity that is opposite that of pixels located in front of the zero disparity plane). Many other techniques may also be used to convey or define depth data for an image.

Two-dimensional video data is generally coded as a sequence of discrete pictures, each of which corresponds to a particular temporal instance. That is, each picture has an associated playback time relative to playback times of other images in the sequence. These pictures may be considered texture pictures or texture images. In depth-based 3D video coding, each texture picture in a sequence may also correspond to a depth map. That is, a depth map corresponding to a texture picture describes depth data for the corresponding texture picture. Multiview video data may include data for various different views, where each view may include a respective sequence of texture components and corresponding depth components.

A picture generally corresponds to a particular temporal instance. Video data may be represented using a sequence of access units, where each access unit includes all data corresponding to a particular temporal instance. Thus, for example, for multiview video data plus depth coding, texture images from each view for a common temporal instance, plus the depth maps for each of the texture images, may all be included within a particular access unit. Hence, an access unit may include multiple views, where each view may include data for a texture component, corresponding to a texture image, and data for a depth component, corresponding to a depth map.

Each access unit may contain multiple view components or pictures. The view components for a particular view are associated with a unique view id or view order index, such that view components of different views are associated with different view ids or view order indices. A view component may include a texture view component as well as a depth view component. The texture and depth view components in the same view may have different layer ids. A texture view component may be coded as one or more texture slices, while the depth view component may be coded as one or more depth slices. Multiview-plus-depth creates a variety of coding possibilities, such as intra-picture, inter-picture, intra-view, inter-view, motion prediction, and the like.

In this manner, 3D video data may be represented using a multiview video plus depth format, in which captured or generated views include texture components associated with corresponding depth maps. Moreover, in 3D video coding, textures and depth maps may be coded and multiplexed into a 3D video bitstream. Depth maps may be coded as gray-scale images, where "luma" samples (that is, pixels) of the depth maps represent depth values.

In general, a block of depth data (a block of samples of a depth map, e.g., corresponding to pixels) may be referred to as a depth block. A depth value may be referred to as a luma value associated with a depth sample. That is, a depth map may generally be treated as a monochrome texture picture, i.e., a texture picture including luminance values and no chrominance values. In any case, conventional intra- and inter-coding methods may be applied for depth map coding.

In 3D-HEVC, the same definition of intra prediction modes is utilized as in HEVC. That is, the intra modes used in 3D-HEVC include the intra modes of HEVC. Also, in 3D-HEVC, Depth Modeling Modes (DMMs) are introduced together with the HEVC intra prediction modes to code an Intra prediction unit of a depth slice.

For better representations of sharp edges in depth maps, the current HTM (3D-HTM version 9.0) applies a DMM method for intra coding of the depth map. A depth block is partitioned into two regions specified by a DMM pattern, where each region is represented by a constant value. The DMM pattern can be either explicitly signaled (DMM mode 1), or predicted by a co-located texture block (DMM mode 4).

Figure 3:
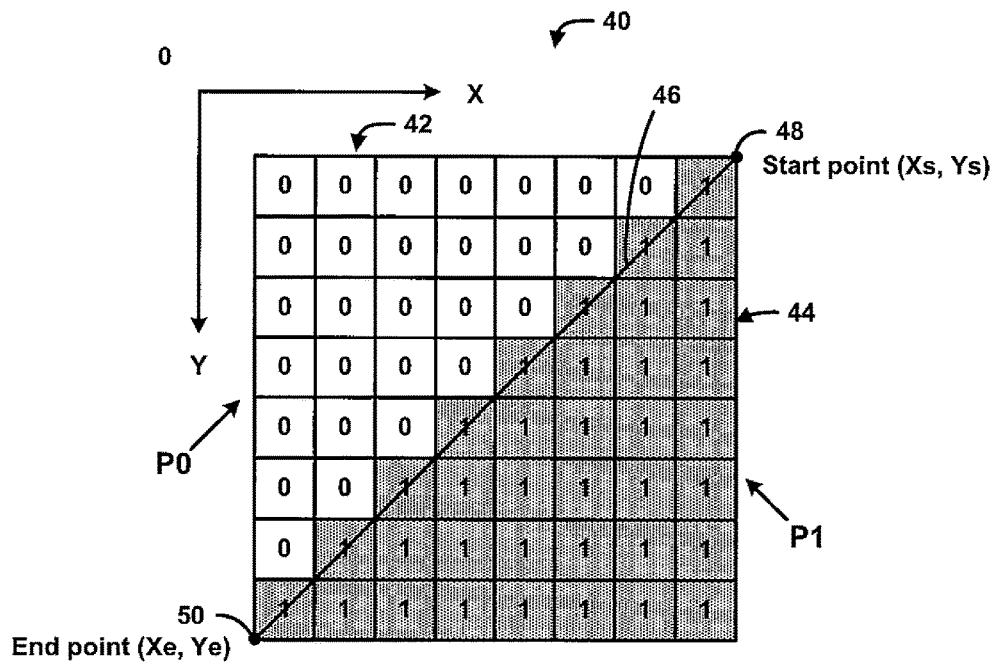
FIG. 3 is a diagram illustrating an example of one wedgelet partition pattern for use in coding an 8×8 block of pixel samples.
Figure 4:
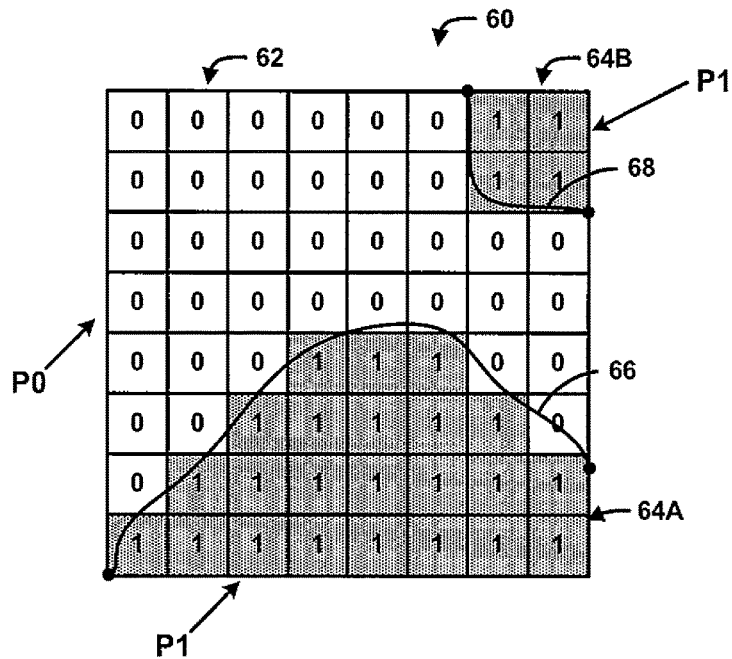
FIG. 4 is a diagram illustrating an example of one contour partition pattern for use in coding an 8×8 block of pixel samples.

There are two types of partitioning models defined in DMM, including Wedgelet partitioning and the Contour partitioning. FIG. 3 is a diagram illustrating an example of a Wedgelet partition pattern for use in coding a block of pixel samples. FIG. 4 is a diagram illustrating an example of a contour partition pattern for use in coding a block of pixel samples. For a Wedgelet partition, as shown in FIG. 3, a depth block is partitioned into two regions by a straight line, where the two regions are labeled with P0 and P1. For Contour partitioning, as shown in FIG. 4, a depth block can be partitioned into two irregular regions.

Contour partitioning is more flexible than the Wedgelet partitioning, but difficult to be explicitly signaled. In DMM mode 4, in the case of 3D-HEVC, the contour partitioning pattern is implicitly derived using reconstructed luma samples of the co-located texture block.

As one example, FIG. 3 provides an illustration of a Wedgelet pattern for an 8×8 block 40. For a Wedgelet partition, a depth block, e.g., PU, is partitioned into two regions 42, 44 by a straight line 46, with a start point 48 located at (Xs, Ys) and an end point 50 located at (Xe, Ye), as illustrated in FIG. 3, where the two regions 42, 44 are also labeled with P0 and P1, respectively. Each pattern in block 40 consists of an array of size uB×vB binary digit labeling whether the corresponding sample belongs to region P0 or P1 where uB and vB represents the horizontal and vertical size of the current PU respectively. The regions P0 and P1 are represented in FIG. 3 by white and shaded samples, respectively. The Wedgelet patterns are initialized at the beginning of both encoding and decoding.

As shown in the example of FIG. 4, a depth block, such as depth block 60, can be partitioned into three irregularly-shaped regions 62, 64A and 64B, using contour partitioning, where region 62 is labeled as P0 and the two regions 64A and 64B are co-labeled as P1, respectively. Although pixels in region 64A are not immediately adjacent to pixels in region 64B, regions 64A and 64B may be defined to form one single region, for the purposes of predicting a PU of depth block 60.

With reference to FIGS. 3 and 4, each individual square within N×N depth blocks 40 and 60 represents a respective individual pixel of depth blocks 40 and 60, respectively. Numeric values within the squares represent whether the corresponding pixel belongs to region 42 (value "0" in the example of FIG. 3) or region 44 (value "1" in the example of FIG. 3). Shading is also used in FIG. 3 to indicate whether a pixel belongs to region 42 (white squares) or region 44 (grey shaded squares).

As discussed above, each pattern (that is, both Wedgelet and Contour) may be defined by an array of size uB×vB binary digit labeling of whether the corresponding sample (that is, pixel) belongs to region P0 or P1 (where P0 corresponds to region 42 in FIG. 3 and region 62 in FIG. 4, and P1 corresponds to region 44 in FIG. 3 and regions 64A, 64B in FIG. 4), where uB and vB represent the horizontal and vertical size of the current PU, respectively. In the examples of FIG. 3 and FIG. 4, the PU corresponds to blocks 40 and 60, respectively.

For HEVC intra prediction modes, a pixel specific intra predictor value is generated for each pixel in the PU by using neighboring samples of the PU, as specified in sub-clause 8.4.2 in HEVC WD 10.

For other depth intra modes, a partition specific DC predictor is calculated for each partition within the PU by using up to two neighboring samples of the PU. Let bPattern[x][y] be the partition pattern of the PU, where x=0 . . . N−1, y=0 . . . N−1 and N is the width of the PU. bPattern[x][y] indicates which partition pixel (x, y) belongs to and bPattern[x][y] can be equal to 0 or 1. Let BitDepth be the bit depth of depth samples and let RecSample[x][y] be the reconstructed neighboring samples of the PU, with x=−1 and y=0 . . . N−1 (corresponds to left neighboring pixels of the PU) or y=−1, x=0 . . . N−1 (corresponds to above neighboring pixels of the PU). Then, the DC predictor of partition X, namely DCPred[X], with X=0 or 1 is derived as follows:

Set bT=(bPatteRN[0][0] !=bPatteRN[N−1][0])? 1:0
Set bL=(bPatteRN[0][0] !=bPatteRN[0][N−1])? 1:0
If bT equals bL $DCPred[X]=(RecSample[-1][0]+RecSample[0][-1])>>1$ $DCPred[1-X]=bL?(RecSample[-1][N-1]+RecSample[N-1][-1])>>1:2^{BitDepth-1}$ Otherwise $DCPred[X]=bL?RecSample[(N-1)>>1][-1]:RecSample[-1][(N-1)>>1]$ $DCPred[1-X]=bL?RecSample[-1][N-1]:RecSample[N-1][-1]$ A Depth Lookup Table (DLT) maps depth indexes to depth values. The DLT can be constructed by analyzing the frames within the first intra period before encoding the full video sequence. In the current design of 3D-HEVC, all of the valid depth values are sorted in ascending order and inserted to the DLT with increasing indexes.

DLT is an optional coding tool. In the current HTM (3D-HTM version 9.0), encoder 20 will not use DLT if more than half of the values from 0 to MAX_DEPTH_VALUE (e.g., 255 for 8-bit depth samples) appear in the original depth map at the analysis step. Otherwise, the DLT will be coded in a sequence parameter set (SPS) and/or video parameter set (VPS). In order for encoder 20 to code DLT, the number of valid depth values is coded with an Exp-Golomb code first. Then, each valid depth value is also coded with an Exp-Golomb code.

Video encoder 20 reads a pre-defined number of frames from the input video sequence to be coded and scans all samples for available depth map values. During this process, encoder 20 generates a mapping table that maps depth values to valid depth values based on the original uncompressed depth map.

Encoder 20 and/or decoder 30 derive the Depth Lookup Table Idx2Depth(.), the Index Lookup TableDepth2Idx(.), the Depth Mapping Table M(.) and the number of valid depth values $d_{valid}$ using the following algorithm that analyzes the depth map $D_t$:

1. Initialization
   boolean vector B(d)=FALSE for all depth values d
   index counter i=0
2. Process each pixel position p in $D_t$ for multiple time instances t:
   Set (B($D_t$(p))=TRUE to mark valid depth values
3. Count number of TRUE values in B(d)→$d_{valid}$
4. For each d with B(d)==TRUE:
   Set Idx2Depth(i)=d
   Set M(d)=d
   Set Depth2Idx(d)=i
   i=i+1
5. For each d with B(d)==FALSE:
   Find d'=arg min|d−d'| and B(d')==TRUE
   Set M(d)=d'
   Set Depth2Idx(d)=Depth2Idx(d').

Mapping from an index Idx back to a depth value d is as follows: d=Idx2Depth [Idx]. Mapping from a depth value d to an index Idx is as follows: Idx=Depth2Idx [d].

Intra SDC mode (i.e., intra segment-wise DC coding, which also may be referred to as intra simplified depth coding) has been introduced in 3D-HEVC together with the HEVC intra prediction modes, DMM modes and chain coding mode to code an intra PU of a depth slice. In the current 3D-HEVC, SDC is only applied for a 2N×2N PU partition size. Instead of coding quantized transform coefficients, SDC modes represent a depth block with the following two types of information:

1. The type of partition of the current depth block, including:
   a. DMM mode 1 (2 partitions)
   b. Planar (1 partition)
2. For each partition, a residual value (in the pixel domain) is signaled in the bitstream.

Two sub-modes are defined in SDC, including SDC mode 1 and SDC mode 2, which correspond to the partition type of Planar and DMM mode 1, respectively. The DC residual value may be represented as a delta DC value indicating a difference in a DC value of a depth PU partition and the DC value of a predicted partition for the depth PU partition. Again, the DC value may be an average pixel value of the depth pixel samples in the depth PU partition.

Simplified residual coding is used in intra SDC. In simplified residual coding, as described above, one DC residual value is signaled for each partition of the PU, and no transform or quantization is applied. To signal the information representing the DC residual value of each partition, as discussed above, two methods can be applied:

1. Directly code the DC residual value of each partition which is calculated by subtracting the predictor, denoted by Pred, generated by neighboring samples from the DC value (i.e., average value, denoted by Aver) of the current partition in the current PU.
2. When DLTs are transmitted, instead of coding the DC residual value, the index difference of the Aver and Pred mapped from the Index Lookup Table is coded.

The index difference is calculated by subtracting the index of Pred from the index of Aver. At the decoder side, the sum of decoded index difference and the index of Pred is mapped back to depth values based on the DLT.

Segment-wise DC coding (SDC) has also been proposed for inter prediction in 3D-HEVC. In particular, the basic idea of SDC is extended to inter prediction mode depth coding. In inter SDC, only one DC residual value, i.e., delta DC, is encoded for a depth PU coded in inter prediction mode. Transform and quantization are skipped, and no additional residual like transform tree is required for a coding unit (CU). Hence, SDC provides an alternative residual coding method by which encoder 20 only encodes and/or video decoder 30 only decodes one DC residual value for a depth PU in intra mode or inter mode.

Figure 5:
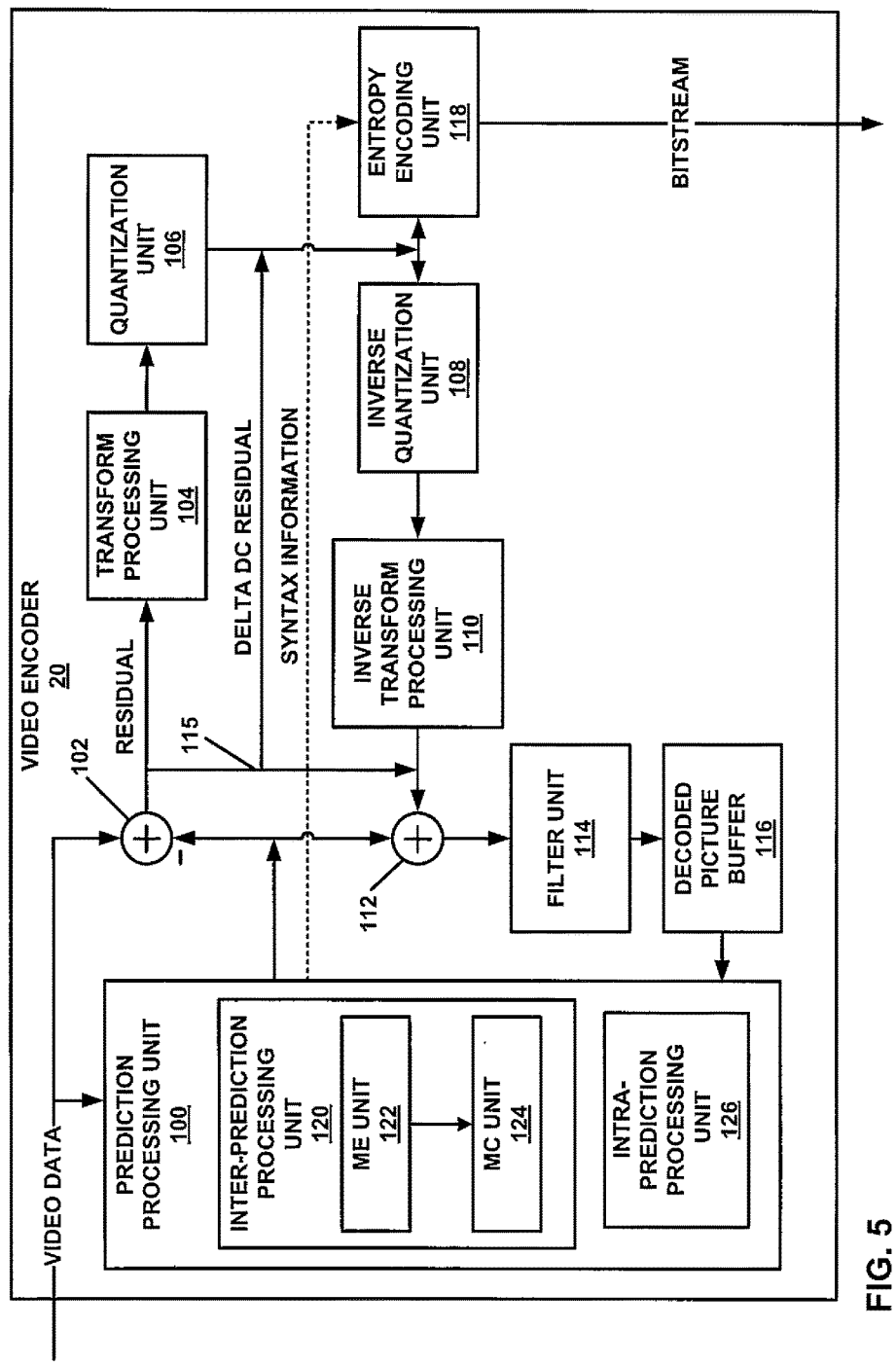
FIG. 5 is a block diagram illustrating an example video encoder that may implement the techniques of this disclosure.

FIG. 5 is a block diagram illustrating an example video encoder 20 that may be configured to implement the techniques of this disclosure, such as the use of modified binarization and/or context modeling processes to reduce the complexity of entropy coding of one or more syntax elements used to represent delta DC residual values, in a 3D coding process, such as 3D-HEVC. In some examples, video encoder 20 may be configured to perform entropy encoding of syntax elements representing delta DC residual values with a reduced number of bins that are coded using context models. Reducing the number of bins that are coded using context models may promote increased throughput in an entropy coder of video encoder 20.

This disclosure describes video encoder 20 in the context of HEVC coding and, more particularly, 3D-HEVC coding, e.g., as described in 3D-HEVC WD and as further modified as described in this disclosure. However, the techniques of this disclosure may be applicable to other coding standards or methods. Accordingly, FIG. 5 is provided for purposes of explanation and should not be considered limiting of the techniques as broadly exemplified and described in this disclosure.

In the example of FIG. 5, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation (ME) unit 122 and a motion compensation (MC) unit 124.

The components of prediction processing unit 100 are described as performing both texture encoding and depth encoding. In some examples, texture and depth encoding may be performed by the same components of prediction processing unit 100 or different components within prediction processing unit 100. For example, separate texture and depth encoders may be provided in some implementations. Also, multiple texture and depth encoders may be provided to encode multiple views, e.g., for multiview plus depth coding.

In either case, prediction processing unit 100 may be configured to intra- or inter-encode texture data and depth data as part of a 3D coding process, such as a 3D-HEVC process. In particular, in some modes, prediction processing unit 100 may use non-SDC residual coding or SDC coding. In the case of SDC or DMM coding, prediction processing unit 100 may generate a delta DC residual value for an intra- or inter-coded depth PU, wherein the delta DC residual value represents a difference between an average value of pixels in a PU or partition of the coded PU and an average value of predicted samples in an intra- or inter-predicted PU partition. A PU may have a single partition or multiple partitions, depending on the coding mode. HEVC intra, HEVC inter modes, DMM's or other modes may be used to code a PU.

In some examples, prediction processing unit 100 may operate substantially in accordance with 3D-HEVC, e.g., as described in the 3D-HEVC WD, subject to modifications and/or additions described in this disclosure, such as those relating to using additional coding modes, or such as those relating to modified binarization and/or context modeling processes to reduce the complexity of entropy coding of one or more syntax elements used to represent delta DC residual values, e.g., when SDC or DMM is used. In some examples, video encoder 20 may include more, fewer, or different functional components than shown in FIG. 5. Prediction processing unit 100 may provide syntax information to entropy encoding unit 118. The syntax information may indicate, for example, which prediction modes were used and information relating to such modes, such as a motion vector, prediction direction, and reference picture index, in the case of inter-prediction.

Video encoder 20 receives video data to be encoded. Video encoder 20 may encode each of a plurality of coding tree units (CTU) in a slice of a picture of the video data. Each of the CTUs may be associated with equally-sized luma coding tree blocks (CTBs) and corresponding chroma CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTB to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks.

Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction. In accordance with aspects of this disclosure, video encoder 20 and video decoder 30 also support non-rectangular partitions of a PU for depth inter coding.

Inter-prediction processing unit 120 may generate predictive data for a PU by performing inter prediction on each PU of a CU. The predictive data for the PU may include predictive sample blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame.

If a PU is in a P slice, motion estimation (ME) unit 122 may search the reference pictures in a list of reference pictures (e.g., "RefPicList0") for a reference region for the PU. The reference pictures may be stored in decoded picture buffer 116. The reference region for the PU may be a region, within a reference picture, that contains sample blocks that most closely corresponds to the sample blocks of the PU. Motion estimation (ME) unit 122 may generate a reference index that indicates a position in RefPicList0 of the reference picture containing the reference region for the PU.

In addition, for inter-coding, motion estimation (ME) unit 122 may generate a motion vector (MV) that indicates a spatial displacement between a coding block of the PU and a reference location associated with the reference region. For instance, the MV may be a two-dimensional vector that provides an offset from the coordinates in the current decoded picture to coordinates in a reference picture. Motion estimation (ME) unit 122 may output the reference index and the MV as the motion information of the PU. Motion compensation (MC) unit 124 may generate the predictive sample blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation (ME) unit 122 may output, as the motion information of the PU, a reference index that indicates a position in RefPicList0 or RefPicList1 of the reference picture that contains the reference region, an MV that indicates a spatial displacement between a sample block of the PU and a reference location associated with the reference region, and one or more prediction direction indicators that indicate whether the reference picture is in RefPicList0 or RefPicList1. Motion compensation (MC) unit 124 may generate the predictive sample blocks of the PU based at least in part on actual or interpolated samples at the reference region indicated by the motion vector of the PU.

To perform bi-directional inter-prediction for a PU, motion estimation unit 122 may search the reference pictures in RefPicList0 for a reference region for the PU and may also search the reference pictures in RefPicList1 for another reference region for the PU. Motion estimation (ME) unit 122 may generate reference picture indexes that indicate positions in RefPicList0 and RefPicList1 of the reference pictures that contain the reference regions. In addition, motion estimation (ME) unit 122 may generate MVs that indicate spatial displacements between the reference location associated with the reference regions and a sample block of the PU. The motion information of the PU may include the reference indexes and the MVs of the PU. Motion compensation (MC) unit 124 may generate the predictive sample blocks of the PU based at least in part on actual or interpolated samples at the reference region indicated by the motion vector of the PU.

Intra-prediction processing unit 126 may generate predictive data for a PU by performing intra prediction on the PU. The intra-predictive data for the PU may include predictive sample blocks for the PU and various syntax elements. Intra-prediction processing unit 126 may perform intra prediction on PUs in I slices, P slices, and B slices. To perform intra prediction on a PU, intra-prediction processing unit 126 may use multiple intra prediction modes to generate multiple sets of predictive data for the PU, and then select one of the intra-prediction modes that yields acceptable or optimal coding performance, e.g., using rate-distortion optimization techniques.

To use an intra prediction mode to generate a set of predictive data for the PU, intra-prediction processing unit 126 may extend samples from sample blocks of spatially neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes, as shown in FIG. 1. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based on the luma, Cb and Cr coding block of a CU and the selected inter- or intra-predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample, i.e., in luma or chroma pixel value, as applicable, in a corresponding selected predictive sample block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

For HEVC intra modes, HEVC inter modes and other modes, such as DMM modes, delta DC coding may be used to generate a delta DC residual value, also referred to as a DC residual value, for a predicted PU or PU partition. For SDC, or for DMM with SDC, residual generation unit 102 may generate a single delta DC value for each depth PU or PU partition, where the single delta DC value represents a difference between an average value of pixels in the PU or PU partition, and an average value of predicted samples in an intra- or inter-predicted PU or PU partition. For DMM, without SDC, residual generation unit 102 may generate a delta DC value and a regular residual tree. The delta DC residual value is not transformed or quantized and may be provided by residual generation unit 102 to entropy coding unit 118 as indicated by line 115.

Reconstruction unit 112 may reconstruct a depth CU based on DC residual values for partitions of PU's of the CU and corresponding predicted partitions of the PU's of the CU. For example, the delta DC residual value for each depth PU partition may be added to the pixels values in a corresponding predicted partition to reconstruct the depth PU partition, wherein the DC residual value may represent a difference between an average value of the pixels of the depth PU partition and the average value of the predicted samples of the predicted partition. For SDC, including DMM with SDC, only the DC residual value is used. For DMM, without SDC, the DC residual value and a residual tree may be used. In some examples, information representing the DC residual value, such as one or more syntax elements representing delta DC values, may be generated by prediction processing unit 100, received by entropy encoding unit 118, and used by reconstruction unit 112 without inverse quantization or inverse transform processing, e.g., as indicated by line 115.

Filter unit 114 may perform one or more deblocking operations to reduce blocking artifacts in the coding blocks associated with a reconstructed CU. Decoded picture buffer 116 may store the reconstructed coding blocks after filter unit 114 performs the one or more deblocking operations on the reconstructed coding blocks. Inter-prediction unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from various functional components of video encoder 20. For example, entropy encoding unit 118 may receive coefficient blocks from quantization unit 106 and may receive syntax elements from prediction processing unit 100. In addition, entropy encoding unit 118 may receive delta DC residual values from residual generation unit 102. Entropy encoding unit 118 may perform one or more entropy encoding operations on the data to generate entropy-encoded data. For example, entropy encoding unit 118 may perform a CABAC operation. Examples of other entropy coding processes include context-adaptive variable length coding (CAVLC), syntax-based context-adaptive binary arithmetic coding (SBAC), and Probability Interval Partitioning Entropy (PIPE) coding. In HEVC, CABAC is used. Video encoder 20 may output a bitstream that includes entropy-encoded data generated by entropy encoding unit 118. For instance, the bitstream may include bits that represent bins of binary syntax elements or binarized syntax elements.

Video encoder 20 is an example of a video encoder configured to perform any of the techniques described in this disclosure. Additional 3D processing components may also be included within video encoder 20. In accordance with one or more techniques of this disclosure, one or more units within video encoder 20 may perform the techniques described herein as part of a video encoding process. Similarly, video encoder 20 may perform a video decoding process to reconstruct video data used as reference data for prediction of subsequently coded video data. Entropy encoding unit 118 may be configured to use modified binarization and/or context modeling processes to reduce the complexity of entropy coding of one or more syntax elements used to represent delta DC residual values.

In some examples, entropy coding unit 118 may be configured to encode no more than N leading bins for a syntax element representing a delta DC residual value using one or more context models, wherein N is less than a maximum possible number of the bins for the binarized syntax element, and bypass encode any remaining bins for the syntax element that were not decoded using one or more context models. For example, entropy coding unit 118 may use a regular coding engine of a CABAC entropy coder to encode the no more than N leading bins for the delta DC syntax element, and use a bypass coding engine of the CABAC entropy coder to encode any remaining bins for the delta DC syntax element. In this manner, entropy encoding unit 118 may simplify entropy coding of the delta DC syntax element.

Figure 6:
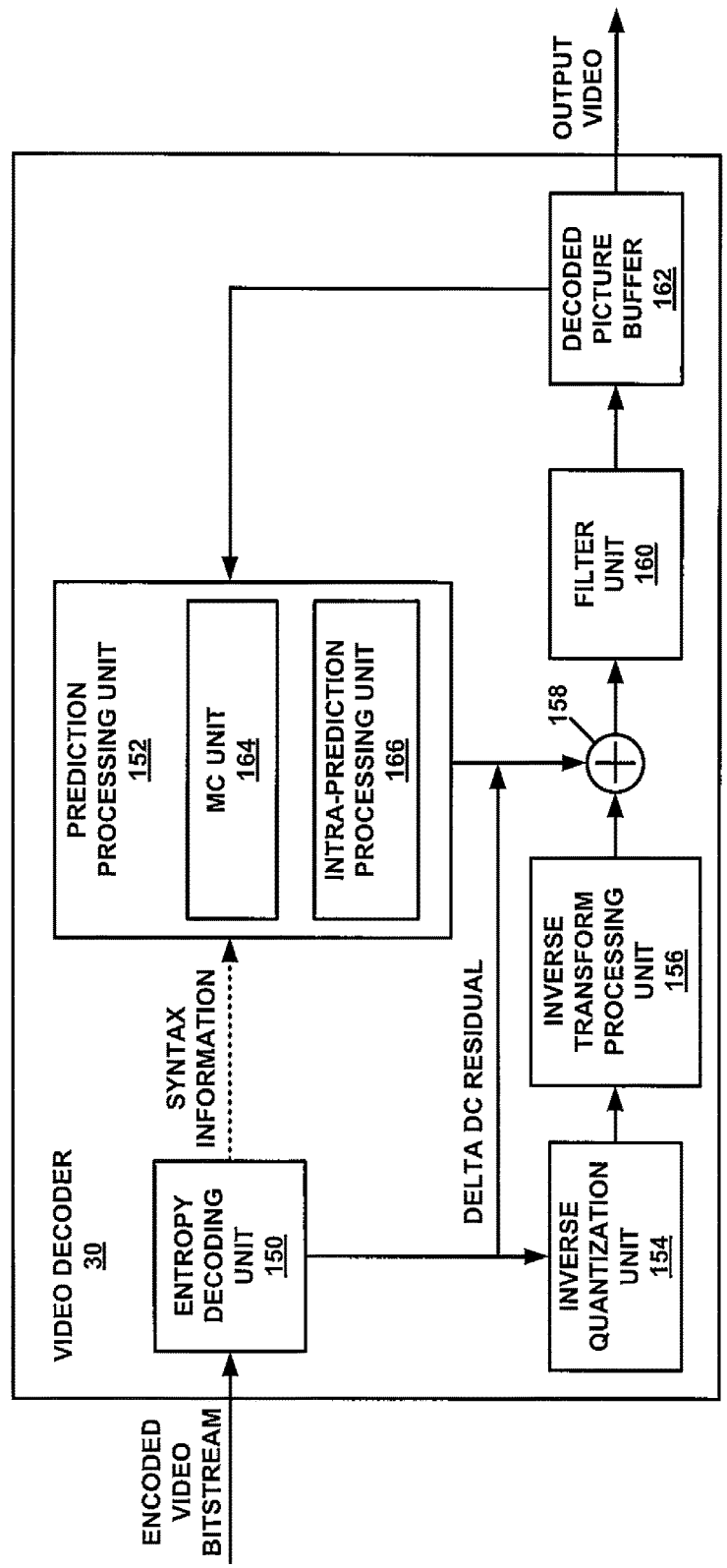
FIG. 6 is a block diagram illustrating an example video decoder that may implement the techniques of this disclosure.

FIG. 6 is a block diagram illustrating an example video decoder 30 that is configured to perform the techniques of this disclosure. FIG. 6 is provided for purposes of illustration and should not be considered limiting of the techniques as broadly exemplified and described in this disclosure. This disclosure describes video decoder 30 in the context of HEVC coding and, in particular, 3D-HEVC coding. However, the techniques of this disclosure may be applicable to other 3D video coding standards or methods. Video decoder 30 may be configured to use modified binarization and/or context modeling processes to reduce the complexity of entropy coding of one or more syntax elements used to represent delta DC residual values, in a 3D coding process, such as 3D-HEVC. In some examples, video encoder 20 may be configured to perform entropy decoding of syntax elements representing delta DC residual values with a reduced number of bins that are coded using context models.

Reducing the number of bins that are coded using context models may promote increased throughput in an entropy decoder of video encoder 20.

In the example of FIG. 6, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation (MC) unit 164 for inter-prediction and an intra-prediction processing unit 166. For ease of illustration, the components of prediction processing unit 152 are described as performing both texture decoding and depth decoding. In some examples, texture and depth decoding may be performed by the same components of prediction processing unit 152 or different components within prediction processing unit 152. For example, separate texture and depth decoders may be provided in some implementations. Also, multiple texture and depth decoders may be provided to decode multiple views, e.g., for multiview plus depth coding. In either case, prediction processing unit 152 may be configured to intra- or inter-decode texture data and depth data as part of a 3D coding process, such as a 3D-HEVC process.

Accordingly, prediction processing unit 152 may operate substantially in accordance with 3D-HEVC, subject to modifications and/or additions described in this disclosure, such as those relating to entropy coding of syntax elements relating to SDC. Prediction processing unit 152 may obtain residual data from the encoded video bitstream for intra-decoded or inter-decoded depth data using SDC or non-SDC residual coding techniques, via entropy decoding unit 150, and reconstruct CU's using intra-predicted or inter-predicted depth data and the residual data. The residual data may be a delta DC residual value, which may be generated, for example, by SDC or DMM coding. In some examples, video decoder 30 may include more, fewer, or different functional components than shown in FIG. 6.

Video decoder 30 receives an encoded video bitstream. Entropy decoding unit 150 parses the bitstream to decode entropy-encoded syntax elements from the bitstream. In some examples, entropy decoding unit 118 may be configured to decode from bits in the bitstream no more than N leading bins for a syntax element representing a delta DC residual value using one or more context models, wherein N is less than a maximum possible number of the bins for the binarized syntax element, and bypass decode any remaining bins for the syntax element that were not decoded using one or more context models. For example, entropy decoding unit 150 may use a regular decoding engine of a CABAC entropy coder to decode the no more than N leading bins for the delta DC syntax element, and use a bypass coding engine of the CABAC entropy coder to decode any remaining bins for the delta DC syntax element. In this manner, entropy decoding unit 150 may simplify entropy decoding of the delta DC syntax element.

Prediction processing unit 152, inverse quantization unit 154, inverse transform processing unit 156, reconstruction unit 158, and filter unit 160 may generate decoded video data based on the syntax elements extracted from the bitstream. The bitstream may comprise a series of NAL units. The NAL units of the bitstream may include coded slice NAL units. As part of decoding the bitstream, entropy decoding unit 150 may extract and entropy decode syntax elements from the coded slice NAL units.

Each of the coded slices may include a slice header and slice data. The slice header may contain syntax elements pertaining to a slice. The syntax elements in the slice header may include a syntax element that identifies a PPS associated with a picture that contains the slice. The PPS may refer to an SPS, which may in turn refer to a VPS. Entropy decoding unit 150 may also entropy decode other elements that may include syntax information, such as SEI messages. Decoded syntax elements in any of the slice header, parameter sets, or SEI messages may include information described herein as being signaled in accordance with example techniques described in this disclosure. Such syntax information may be provided to prediction processing unit 152 for decoding and reconstruction of texture or depth blocks.

Video decoder 30 may perform a reconstruction operation on a non-partitioned CU's and PUs. To perform the reconstruction operation, for non-SDC coding, video decoder 30 may perform a reconstruction operation on each TU of the CU. By performing the reconstruction operation for each TU of the CU, video decoder 30 may reconstruct blocks of the CU. As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra-prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

If a PU is encoded using inter-prediction, MC unit 164 may perform intra prediction to generate an inter-predictive block for the PU. MC unit 164 may use an inter prediction mode to generate the predictive luma, Cb and Cr blocks for the PU based on the prediction blocks of PUs in other pictures or views. MC unit 164 may determine the inter prediction mode for the PU based on one or more syntax elements decoded from the bitstream, and may receive motion information such as motion vectors, prediction direction, and reference picture indexes.

For inter-prediction, MC unit 164 may construct a first reference picture list (RefPicList0) and a second reference picture list (RefPicList1) based on syntax elements extracted from the bitstream. If a PU is encoded using inter prediction, entropy decoding unit 150 may extract motion information for the PU. MC unit 164 may determine, based on the motion information of the PU, one or more reference blocks for the PU. Motion compensation (MC) unit 164 may generate, based on samples in blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add residual samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 2. For instance, video decoder 30 may perform, based on the luma, Cb and Cr blocks in decoded picture buffer 162, intra prediction or inter prediction operations on PUs of other CUs.

Video decoder 30 is an example of a video decoder configured to use modified binarization and/or context modeling processes to reduce the complexity of entropy coding of one or more syntax elements used to represent delta DC residual values, as described herein. In accordance with one or more techniques of this disclosure, one or more units within video decoder 30 may perform one or more techniques described herein as part of a video decoding process. Additional 3D coding components may also be included within video decoder 30.

Prediction processing unit 152 and, more particularly, intra-prediction processing unit 166 and motion compensation (MC) unit 164, may determine, based on received syntax information, whether to perform SDC or DMM in depth intra-prediction modes and depth inter-prediction modes, as applicable, of a 3D video coding process, such as 3D-HEVC. When SDC or DMM is used, for example, entropy decoding unit 150 may entropy decode one or more delta DC residual values for PU's or PU partitions of a depth CU, as well as associated syntax information.

For SDC, entropy decoding unit 150 may provide SDC syntax information for the block to prediction processing unit 152, as indicated in FIG. 6. Entropy decoding unit 150 may provide delta DC residual value to reconstruction unit 158. The delta DC residual values received by video decoder 30 are not transformed and quantized. In particular, the delta DC residual value(s) need not be first provided to inverse quantization unit 154 and inverse transform processing unit 156 for inverse quantization and inverse transformation. Instead, entropy decoding unit 150 may decode, from bits in the bitstream, bins for a syntax element representing a delta DC residual value, and provide information representing the delta DC residual value to reconstruction unit 158 for use in reconstructing a coded PU or partition. Reconstruction unit 158 may receive an intra- or inter-predicted PU or PU partition of a depth CU from prediction processing unit 152 and add the delta DC residual value to each of the samples of the predicted PU or PU partition to reconstruct the coded PU or PU partition.

In this manner, when SDC or DMM is used, for example, reconstruction unit 158 may reconstruct a depth CU based on delta DC residual values for partitions of PU's of the CU and corresponding predicted PUs or PU partitions of the CU. Again, the delta DC residual value may represent a difference between an average value of the pixels of the depth PU or PU partition and the average value of the predicted samples of the predicted PU or PU partition. When DMM is used without SDC, a regular residual coding tree may be used in addition to the delta DC value.

Syntax elements, semantics and the parsing process for delta DC coding for inter- and intra-prediction according to the 3D-HEVC WD are presented below. In the description below, section numbers such as, e.g., H.7.3.8.5, refer to corresponding section numbers in 3D-HEVC WD.

Syntax

H.7.3.8.5 Coding Unit Syntax

|  | Descriptor |
|---|---|
| coding_unit( x0, y0, log2CbSize , ctDepth) { | |
| ... | |
|    if( vps_inter_sdc_flag && PredMode[ x0 ][ y0 ] ! = MODE_INTRA | |
|       && !skip_flag[ x0 ][ y0 ] ) | |
|      inter_sdc_flag | ae(v) |
|    if( inter_sdc_flag ) { | |
|      puNum = ( PartMode = = PART_2Nx2N ) ? 1 : ( PartMode = = PART_NxN ? 4 : 2 ) | |
|      for( i = 0; i < puNum; i++ ) { | |
|        inter_sdc_resi_abs_minus1[ x0 ][ y0 ][ i ] | ae(v) |
|        inter_sdc_resi_sign_flag[ x0 ][ y0 ][ i ] | ae(v) |
|      } | |
|    } | |
|    if( !pcm_flag[ x0 ][ y0 ] ) { | |
|      if( CuPredMode[ x0 ][ y0 ] != MODE_INTRA && | |
|        !( PartMode = = PART_2Nx2N && merge_flag[ x0 ][ y0 ] ) ) | |
|       rqt_root_cbf | ae(v) |
|      if( rqt_root_cbf && !inter_sdc_flag ) { | |
|        MaxTrafoDepth = ( CuPredMode[ x0 ][ y0 ] = = MODE_INTRA ? | |
|               ( max_transform_hierarchy_depth_intra + IntraSplitFlag ) : | |
|               max_transform_hierarchy_depth_inter ) | |
|        transform_tree( x0, y0, x0, y0, log2CbSize, 0, 0 ) | |
|      } | |
|    } | |
|   } | |
| } | |

H.7.3.8.5.1 Depth Mode Parameter Syntax

| | Descriptor |
|---|---|
| depth_mode_parameters( x0 , y0 , log2CbSize ) { | |
|   depth_intra_mode[ x0 ][ y0 ] | ae(v) |
|   if ( DepthIntraMode[ x0 ][ y0 ] = = INTRA_DEP_DMM_WFULL \|\| | |
|     DepthIntraMode[ x0 ][ y0 ] = = INTRA_DEP_SDC_DMM_WFULL ) | |
|     wedge_full_tab_idx[ x0 ][ y0 ] | ae(v) |
|   if( DmmFlag[ x0 ][ y0 ] \|\| SdcFlag[ x0 ][ y0 ] ) { | |
|     dcNumSeg = ( DepthIntraMode[ x0 ][ y0 ] = = INTRA_DEP_SDC_PLANAR ) ? 1 : 2 | |
|     depth_dc_flag[ x0 ][ y0 ] | ae(v) |
|     if ( depth_dc_flag [ x0 ][ y0 ] ) | |
|       for( i = 0; i < dcNumSeg; i ++ ) { | |
|         depth_dc_abs[ x0 ][ y0 ][ i ] | ae(v) |
|         if ( depth_dc_abs[ x0 ][ y0 ][ i ]) | |
|           depth_dc_sign_flag[ x0 ][ y0 ][ i ] | ae(v) |
|       } | |
|   } | |
| } | |

Semantics
H.7.4.9.5 Coding Unit Semantics
. . .
inter_sdc_flag equal to 1 specifies simplified depth coding of residual blocks is used for the current coding unit. inter_sdc_flag equal to 0 specifies simplified depth coding of residual blocks is not used for the current coding unit. When not present, inter_sdc_flag is inferred to be equal to 0.
inter_sdc_resi_abs_minus1 [x0][y0][i], inter_sdc_resi_sign_flag[x0][y0][i] are used to derive InterSdcResi[x0][y0][i] as follows:

−InterSdcResi[$x0$][$y0$][$i$]=(1−2*inter_*sdc*_resi_sign_flag[$x0$][$y0$][$i$])*(inter_*sdc*_resi_abs_minus1[$x0$][$y0$][$i$]+1)     (H-19)

H.7.4.9.5.1 Depth Mode Parameter Semantics
. . .
depth_dc_flag[x0][y0] equal to 1 specifies that depth_dc_abs[x0][y0][i] and depth_dc_sign_flag[x0][y0][i] are present. depth_dc_flag[x0][y0] equal to 0 specifies that depth_dc_abs[x0][y0][i] and depth_dc_sign_flag[x0][y0][i] are not present.
depth_dc_abs[x0][y0][i], depth_dc_sign_flag[x0][y0][i] are used to derive DcOffset[x0][y0][i] as follows:

$Dc$Offset[$x0$][$y0$][$i$]=(1−2*depth_*dc*_sign_flag[$x0$][$y0$][$i$])*(depth_*dc*_abs[$x0$][$y0$][$i$]−$dc$NumSeg+2)     (H-27)

The parsing process for parsing some of the syntax elements used in SDC mode will now be described. In 3D-HEVC, for inter SDC, inter_sdc_resi_abs_minus1 and inter_sdc_resi_sign_flag are encoded by encoder 20 and decoded by decoder 30 to represent delta DC. The syntax element inter_sdc_resi_abs_minus1 represents the delta DC value for inter SDC, and the syntax element inter_sdc_resi_sign_flag represents the sign of the delta DC value for inter SDC.

For intra SDC and DMM modes, depth_dc_abs and depth_dc_sign_flag are encoded by encoder 20 and decoded by decoder 30 to represent delta DC. The syntax element depth_dc_abs represents the delta DC value for intra SDC and DMM, and the syntax element depth_dc_sign_flag represents the sign of the delta DC value for intra SDC and DMM.

Binarization methods used by encoder 20 and decoder 30 are the same for the inter_sdc_resi_abs_minus1 and depth_dc_abs syntax elements. Similar to the binarization method for cu_qp_delta_abs, the binarization of the syntax elements inter_sdc_resi_abs_minus1 and depth_dc_abs is a concatenation of a prefix bin (with TR) string and (when present) a suffix bin string (with EGk).

For the derivation of the prefix bin string for inter_sdc_resi_abs_minus1 and depth_dc_abs, entropy encoding unit 118 and/or entropy decoding unit 150 may apply the operations described below. In this discussion, reference to the phrase "inter_sdc_resi_abs_minus1/depth_dc_abs" refers to application of the indicated operation to either inter_sdc_resi_abs_minus1 or depth_dc_abs, as applicable. That is, the same binarization process is applied to inter_sdc_resi_abs_minus1 and depth_dc_abs. Accordingly, for brevity, the operations described below are applied to either the inter_sdc_resi_abs_minus1 syntax element or the depth_dc_abs syntax element (i.e., inter_sdc_resi_abs_minus1/depth_dc_abs), depending on whether the inter_sdc_resi_abs_minus1 syntax element for an inter-predicted depth partition or the depth_dc_abs syntax element is being binarized for an intra-predicted depth partition. Derivation of the prefix string may be performed as follows:

The prefix value of inter_sdc_resi_abs_minus or depth_dc_abs (inter_sdc_resi_abs_minus1/depth_dc_abs), prefixVal, is derived as follows:

prefixVal=Min(inter_*sdc*_resi_abs_minus1/depth_*dc*_abs,13)

The prefix bin string for inter_sdc_resi_abs_minus1/depth_dc_abs is specified by invoking the TR binarization process for prefixVal with cMax=13 and cRiceParam=0.

When prefixVal is greater than 12, the suffix bin string for the inter_sdc_resi_abs_minus1 syntax element or the depth_dc_abs syntax element is present and it is derived as follows:

The suffix value of inter_sdc_resi_abs_minus1 or depth_dc_abs, suffixVal, is derived as follows:

suffixVal=inter_*sdc*_resi_abs_minus1/depth_*dc*_abs−13

The suffix bin string is specified by invoking the EG0 binarization process.

When the bit depth of a depth pixel is 8, delta DC of inter SDC, intra SDC and DMM can range from −255 to 255. Therefore, at most, 28 bins are coded for the inter_sdc_resi_abs_minus1 or depth_dc_abs syntax elements.

In 3D-HEVC, all of the bins in the prefix bin string are coded with one context mode in the regular coding engine and all of the bins in the suffix bin string are coded with the bypass mode in the bypass coding engine of the CABAC coders in entropy encoding unit 118 and/or entropy decoding unit 150.

In HEVC, usually no more than 9 bins are coded using context models for a syntax element. However, in delta DC coding for 3D-HEVC, at most 13 bins are coded using a context model for syntax elements inter_sdc_resi_abs_minus1 and depth_dc_abs. Context coding of a large number of bins, such as the 13 bins that are context coded for inter_sdc_resi_abs_minus1 and depth_dc_abs, can slow down the operation of entropy entropy encoding unit 118 and/or entropy decoding unit 150.

In accordance with various examples of this disclosure, entropy coding of syntax elements for delta DC residual value coding may be modified to enhance performance of an entropy coder, such as entropy encoding unit 118 and/or entropy decoding unit 150. For example, a CABAC coder used by entropy encoding unit 118 and/or entropy decoding unit 150 may be configured to reduce the number of bins that are coded in the regular coding engine using context models for delta DC coding, thereby simplifying DC residual coding in a 3D video coding process, such as 3D-HEVC.

In general, entropy encoding unit 118 may binarize values of the inter_sdc_resi_abs_minus1 and depth_dc_abs syntax elements and encode the bins of the resulting binarized syntax elements in a CABAC coder to generate an encoded bitstream. Entropy decoding unit 150 may decode the bins from bits in the bitstream in a CABAC coder, and de-binarize the bins to generate the inter_sdc_resi_abs_minus1 and depth_dc_abs syntax elements. The bins that are coded by entropy encoding unit 118 and entropy decoding unit 150 with one or more context models may be limited to not more than N leading bins of the syntax element, where N is less than a maximum possible number of the bins for the syntax element. The maximum possible number of bins for the syntax element may correspond to a maximum value of the syntax element.

In some examples, the techniques may use modified binarization and/or context modeling processes to reduce the number of context coded bins, and reduce the complexity of entropy coding, for one or more syntax elements used to represent delta DC residual values. Context-coded bins refer to bins that are coded using context models in the regular coding engine of the CABAC coder, whereas bins that are not context-coded may be bypass coded in a bypass coding engine of the CABAC coder without selection of context models. Reducing the number of bins that are coded using context models may promote increased throughput in a CABAC encoder/decoder.

In some examples, the number of bins that are coded by entropy encoding unit 118 and entropy decoding unit 150 with one or more context models may be limited to be not more than N leading bins of the syntax element, where N is less than a maximum possible number of the bins for the syntax element. The number of bins for a binarized syntax element may vary according to the value of the syntax element, and could be less than N or greater than N. However, the value of N is less than the maximum possible number of bins, i.e., the number of bins that could be produced for a maximum value of the syntax element.

Accordingly, in this example, no more than N bins, to the extent available, are coded with one or more context models, such that the number of bins (N or less than N) coded with one or more context models is less than the maximum possible number of bins. The number of bins that are context coded may depend at least in part on the actual number of bins that are generated for a given value of the syntax element, as different syntax element values may yield different numbers of bins.

Various aspects of examples of techniques for reducing the number of bins that are coded using context models for syntax elements representing delta DC values are described in detail below. The various examples are not necessarily mutually exclusive, and may be combined in a variety of combinations, as broadly described herein.

1. In a first example, regardless of the binarization method used for binarization of each of the inter_sdc_resi_abs_minus1 and depth_dc_abs syntax elements, the bin string that is entropy coded by entropy encoding unit 118 or entropy decoding unit 150 can have up to N bins which are not coded with the bypass mode. That is, the number of bins of the inter_sdc_resi_abs_minus1 an d depth_dc_abs syntax elements that are coded by entropy encoding unit 118 or entropy decoding unit 150 using context models may be limited to be no more than N bins. In this example, no more than N leading bins are coded in the regular coding engine of the CABAC coder, while the remaining bins of the inter_sdc_resi_abs_minus1 an d depth_dc_abs syntax elements are coded in the bypass coding engine of the CABAC coder. In the regular coding engine, context models may be selected to code the bins. In the bypass coding engine of the CABAC coder, a fixed probability model may be used to code the bins, such that no context models are used for coding. The value of N (for the up to N leading bins that are not coded with the bypass mode) is less than the maximum possible number of bins for the syntax element, e.g., less than a maximum number of bins that would be generated by binarization of a maximum value of the syntax element. In some examples, N=9, such that up to 9 leading bins of each of the inter_sdc_resi_abs_minus1 an d depth_dc_abs syntax elements are coded with one or more context models, i.e., without bypass, and remaining bins, if any, are bypass coded, i.e., not coded with context models. If at most 13 bins are coded for syntax element inter_sdc_resi_abs_minus1 and depth_dc_abs, as an example, then limiting context coding to N=9 bins can reduce the number of bins that must be coded in the regular coding engine with one or more context models.

a. In one example, limitation of context coding to no more than N bins can be fixed or selectively activated. For example, the maximum number of bins of the inter_sdc_resi_abs_minus1 and depth_dc_abs syntax elements that are coded with context models may be fixed at N (e.g., N=9) bins, and activated on a fixed basis, e.g., such that the limit of no more than N bins being context coded is always active. That is, entropy encoding unit 118 and entropy decoding unit 150 may be configured to always entropy code no more than N leading bins of a binarized syntax element (inter_sdc_resi_abs_minus1 or depth_dc_abs) on a fixed basis. Alternatively, applying the limitation such that no more than N bins are to be coded without bypass may be selectively controlled by a flag that is generated by encoder 20 and received by decoder 30. The flag may be signaled, for example, in a parameter set, such as a video parameter set (VPS), sequence parameter set (SPS), or picture parameter set (PPS), and/or may be further constrained as part of a profile and level definition.

For example, entropy encoding unit 118 and/or entropy decoding unit 150 may code (i.e., encode in the case of entropy encoding unit 118 and decode in the case of entropy decoding unit 150) a flag or other syntax element in a VPS, SPS, PPS, or similar data structure, that indicates whether the number of bins that are not bypass coded is limited to no more than N leading bins, or whether the number of bins that are not bypass coded is not limited (or is limited to some number of bins greater than N bins). As another example, information such as a flag or other syntax element that limits entropy coding with context models to no more than the N leading bins of the inter_sdc_resi_abs_minus1 or depth_dc_abs syntax element may be coded in profile or level information for a given bitstream.

If the flag has a first value, then context coding of bins of the inter_sdc_resi_abs_minus1 and depth_dc_abs syntax elements is limited to be no more than the first N bins of the binarized syntax elements, wherein N is less than a maximum possible number of the bins for the syntax element, and the remaining bins are bypass coded and not context coded. If the flag has a second value, then context coding of bins of the inter_sdc_resi_abs_minus1 and depth_dc_abs syntax elements is not limited to be no more than the first N bins of the binarized syntax elements, and all bins or at least more than the N bins may be coded with one or more context models. The value of N is less than a maximum possible number of the bins for the syntax element.

If the syntax element is binarized to have 13 bins, for example, and N=9, then entropy encoding unit 118 and entropy decoding unit 150 may be configured to code 9, or at least no more than 9 bins with one or more context models, and code the remaining 4 bins with bypass coding, i.e., without using one or more context models. If the syntax element is binarized to have 8 bins, and N=9, then all 8 bins can be coded using one or more context models. The number of bins of a binarized syntax element may vary according to the value of the syntax element, such that there may be less than N or more than N bins. In some examples, however, this constraint may be applied so that, regardless of the number of bins, no more than N bins will be coded with context models.

b. In some examples, as an alternative or in addition to restricting context coding to no more than the first N leading bins, one context model, i.e., the same context model, may be used to code all bins of the inter_sdc_resi_abs_minus1 and depth_dc_abs syntax elements that are not bypass coded, i.e., all bins that are context coded in the regular coding engine of the CABAC coder. For example, entropy encoding unit 118 and/or entropy decoding unit 150 may be configured to code all bins that are not bypass coded with the same context model. In this case, for example, a regular coding engine of a CABAC coder is used to code the bins that are not bypass coded with the same context model, while other remaining bins are bypass coded in a bypass coding engine of the CABAC coder. Hence, no more than the first N bins may be coded with a context model, and each of the no more than N bins are coded with the same context model, while any remaining bins are bypass coded. In this example, the first N bins share the same context model, and none of the first N bins are coded with different context models. If N=9, as described above, and the inter_sdc_resi_abs_minus1 or depth_dc_abs syntax element has 13 bins, then entropy encoding unit 118 and entropy decoding unit 150 may context code the first 9 bins in the regular coding engine of the CABAC coder with the same context model, and bypass code the remaining 4 bins in the bypass coding engine of the CABAC coder.

c. As an alternative to item 1b above, in addition to restricting context coding to no more than the first N leading bins, separate context models may be used to code at least some of the no more than N leading bins that are not bypass coded. For example, each bin that is not bypass coded subject to the limit of the first N leading bins, where N is less than the maximum possible number of bins for the syntax element, may be coded with its own, separate context model. Alternatively, at least some of the no more than N leading bins that are not bypass coded may be coded with the same context model as one another, while some other bins of the no more than N leading bins that are not bypass coded may be coded with one or more different context models. As an example, if no more than N leading bins are to be coded with context models, at least some of the first N bins of the binarized syntax element inter_sdc_resi_abs_minus1 or depth_dc_abs syntax element may be coded by entropy encoding unit 118 or entropy decoding unit 150 with the same context model while one or more other bins of the first N bins are coded with one or more different context models, and any remaining bins after the first N bins are bypass coded without using context models. Again, coding may refer generally to encoding or decoding, as applicable, and may refer to operations performed by entropy encoding unit 118 of video encoder 20 or entropy decoding unit 150 of video decoder 30.

2. In an example, it is proposed that, in delta DC coding, the binarization of the inter_sdc_resi_abs_minus1 and depth_dc_abs syntax elements performed by entropy encoding unit 118 and entropy decoding unit 150 is similar to the binarization in 3D-HEVC WD, but that the number of bins of the inter_sdc_resi_abs_minus1 or depth_dc_abs syntax element that are coded with one or more context models is reduced. For example, the number of bins that are not bypass coded may be reduced as described above in item 1, by context coding no more than the first leading N bins, where N is less than the maximum possible number of bins for the syntax element, and the same binarization used according to the 3D-HEVC WD can be used. In this case, the number of bins that are not bypass coded may be modified, relative to the 3D-HEVC WD, but the binarization process may be the same as in 3D-HEVC WD.

a. In another example, the binarization may be modified. Binarization of each of inter_sdc_resi_abs_minus1 and depth_dc_abs by entropy encoding unit 118 and entropy decoding unit 150 is still a concatenation of a prefix bin (with Truncated Rice (TR), cRiceParam=0) string and (when present) a suffix bin string (with 0-th order Exp-Golomb (EG0)). However, the cMax value used by the TR process to indicate the maximum value of the prefix bin string is changed from 13 to N wherein N is a positive integer number (e.g., N=9 as described in item 1 above). When the value of the syntax element inter_sdc_resi_abs_minus1 or depth_dc_abs is smaller than the value cMax, only the prefix bin string is generated, and a suffix bin string is not present. Otherwise, the suffix bin string is present in the bins that represent the syntax element. The binarization determines the bins that entropy encoding unit 118 encodes into bits in the bitstream based on the syntax element, and the number of bins that entropy decoding unit 150 decodes from the bits in the bitstream to recover the syntax element. An example of this binarization process (with cMax equal to N) is illustrated in Table 3 below. The value of N may be less than a maximum possible number of bins for the syntax element. In one example, N is set to be equal to 9. In this example, by limiting cMax to N, the number of bins in the prefix string is limited to be no more than N. Entropy encoding unit 118 and entropy decoding unit 150 may code the bins with the modified binarization.

TABLE 3

Binarization of inter_sdc_resi_abs_minus1/depth_dc_abs

| Value | prefix bin string | | | | | Suffix bin string |
|---|---|---|---|---|---|---|
| 0 | 0 | | | | | |
| 1 | 1 | 0 | | | | |
| 2 | 1 | 1 | 0 | | | |
| 3 | 1 | 1 | 1 | 0 | | |
| ... | | | | | | |
| N − 1 | 1 | ... | | | 1 | 0 |
| N | 1 | ... | | | 1 | 0 |
| N + 1 | 1 | ... | | | 1 | 100 |
| N + 2 | 1 | ... | | | 1 | 101 |
| N + 3 | 1 | ... | | | 1 | 11000 |
| ... | | | | | | |
| 255 | 1 | ... | | | 1 | |
| binIdx | 0 | 1 | 2 | 3 | N − 2 | N − 1 | b. Furthermore, in one example, the first M bins (with binIdx smaller than M) in inter_sdc_resi_abs_minus1/depth_dc_abs may be coded using one or more context models and the remaining bins are bypass coded. In one example, the first M bins (with binIdx smaller than M) in inter_sdc_resi_abs_minus1/depth_dc_abs may be coded using the same context model as one another and the remaining bins are bypass coded. Hence, coding with one or more context models may refer to coding M bins with the same context model as one another or coding some of the M bins with different context models. In some examples, the bins may be coded using a binarization as described in item 2a above. Item 2a describes an example binarization, and this item 2b describes which bins of such a binarization should be coded with a context model and which bins should be bypass coded. Here, only the first M bins are coded with a context model, and any remaining bins are bypass coded. As mentioned above, the first M bins may be coded with one or more context models. In some examples, the first M bins may be coded with the same context model. In one example, M is equal to 9. Alternatively, or additionally, M may be less than or equal to N, where N indicates the cMax value used by the TR process to indicate the maximum value of the prefix bin string, as described above with reference to the binarization process in item 2a. If M is larger than N, both prefix and at least some suffix bins (e.g., as generated in the binarization process described above in item 2a) may be coded using one or more context models, and remaining bins are bypass coded. Otherwise, if M is less than or equal to N, only prefix bins are coded using one or more context models, and any remaining bins are bypass coded. If M is less than N, only a subset of the prefix bins (less than all possible N prefix bins) are coded using a context model, e.g., the same context model in some examples, and any remaining bins are bypass coded. As an illustration, if N=9, and M=6, then entropy encoding unit 118 and entropy decoding unit 150 code the first M=6 bins with one or more context models, e.g., the same context model in some examples, and bypass code the remaining bins, if any. In this example, if M is less than or equal to N, entropy encoding unit 118 and entropy decoding unit 150 may code the bins such that no more than the first N leading bins are coded with one or more context models. For example, M bins (where M is less than or equal to N) are coded using one or more context models, and any remaining bins that are not context coded are bypass coded. In some examples, the M bins may be coded with the same context model as one another.

c. As an additional feature, the inter_sdc_resi_abs_minus1 and depth_dc_abs syntax elements may each be restricted to be in the range [0, N−1] to make sure that the syntax element is binarized into no more than N bins, e.g., where N=9. For example, the value of inter_sdc_resi_abs_minus1 or depth_dc_abs can be clipped to a desired range that is less than the maximum range of the syntax element, such that the value is binarized into no more than N=9 bins, which is less than the maximum possible number of bins for the syntax element, i.e., for the unclipped, maximum value of the syntax element. In this case, by clipping the value of the syntax element to [0, N−1], no more than N leading bins are coded with context models, because only N bins are actually present in the bin string for the syntax element. Any bins that are context coded can be bypass coded.

In other examples, the range of the syntax element value may be set to [0, P−1], where P is greater than N. In this case, entropy encoding unit 118 or entropy decoding unit 150 may code no more than N leading bins of the P bins, where N is less than a maximum possible number of the bins corresponding to a maximum value of the syntax element, with one or more context models in the CABAC coder, and bypass code any remaining P-N bins, if available, without context models.

In this example, in general, the value of the inter_sdc_resi_abs_minus1 or depth_dc_abs syntax element may be restricted to a range that is selected to limit the number of bins to be less than a maximum possible number of bins for the syntax element. A number of N leading bins for the syntax element can be coded, e.g., in a regular coding engine of a CABAC coder, using one or more context models, where N is less than the maximum possible number of bins, given the maximum possible value of the syntax element, and less than or equal to the maximum actual number of bins, given the maximum clipped value of the syntax element. Any remaining bins are bypass coded, e.g., in a bypass coding engine of a CABAC coder, without the use of one or more context models.

d. Alternatively, in another example, binarization of each of the syntax elements inter_sdc_resi_abs_minus1 and depth_dc_abs may still be a concatenation of a prefix bin (with Truncated Rice (TR), cRiceParam=0) string and (when present) a suffix bin string, but the suffix bin string may be generated with a k-th order Exp-Golomb (EGk) binarization. In this example, k is unequal to 0, e.g., k is equal to 3. Hence, instead of using a 0-th order Exp-Golomb (EG0) binarization for inter_sdc_resi_abs_minus1 or depth_dc_abs as in item 2a above, a k-th order Exp-Golomb binarization (EGk) (where k is not equal to 0) is used for binarization of the suffix bin string. Entropy encoding unit 118 and entropy decoding unit 150 may still be configured to code no more than the first N leading bins using one or more context models, and bypass code any remaining bins of the syntax element.

e. As another alternative, binarization of each of the syntax elements inter_sdc_resi_abs_minus1 and depth_dc_abs may still be a concatenation of a prefix bin (generated with Truncated Rice (TR), cRiceParam=0) string and (when present) a suffix bin string, but the suffix bin string may be generated with fixed length coding binarization. Hence, instead of using a 0-th order Exp-Golomb (EG0) binarization for the suffix bin string of inter_sdc_resi_abs_minus1 or depth_dc_abs as in item 2a above, or a k-th order Exp-Golomb (EGk) binarization (where k is not equal to 0) as in item 2d above, a fixed length coding can be used to binarize the suffix bin string. Entropy encoding unit 118 and entropy decoding unit 150 may still be configured to code no more than the first N leading bins using one or more context models, and bypass code any remaining bins of the syntax element. An example of a fixed length coding for binarization is shown in Table 4 below.

TABLE 4

Binarization of fixed length (with length equal to 8) coding

| Value | fixed length coding |
|---|---|
| 0 | 0 0 0 0 0 0 0 0 |
| 1 | 0 0 0 0 0 0 0 1 |
| 2 | 0 0 0 0 0 0 1 0 |
| 3 | 0 0 0 0 0 0 1 1 |
| 4 | 0 0 0 0 0 1 0 0 |
| 5 | 0 0 0 0 0 1 0 1 |
| 6 | 0 0 0 0 0 1 1 0 |
| 7 | 0 0 0 0 0 1 1 1 |
| 8 | 0 0 0 0 1 0 0 0 |
| ... | |
| 255 | 1 1 1 1 1 1 1 1 |
| binIdx | 0 1 2 3 4 5 6 7 |

3. Alternatively, the inter_sdc_resi_abs_minus1 and depth_dc_abs syntax elements are each binarized using a k-th order Exp-Golomb code. In this example, entropy encoding unit 118 and entropy decoding unit 150 may be configured to code no more than the first N leading bins of the syntax element using one or more context models, and bypass code any remaining bins of the syntax element, but a different binarization may be used for the inter_sdc_resi_abs_minus1 and depth_dc_abs syntax elements.

a. In one example, for the k-th order Exp-Golomb code, k is equal to 0 and the binarization of inter_sdc_resi_abs_minus1 or depth_dc_abs (inter_sdc_resi_abs_minus1/depth_dc_abs) is illustrated in Table 5 below.

TABLE 5

Binarization of inter_sdc_resi_abs_minus1/depth_dc_abs

| Value | 0-th order Exp-Golomb code |
|---|---|
| 0 | 0 |
| 1 | 1 0 0 |
| 2 | 1 0 1 |
| 3 | 1 1 0 0 0 |
| 4 | 1 1 0 0 1 |
| 5 | 1 1 0 1 0 |
| 6 | 1 1 0 1 1 |
| 7 | 1 1 1 0 0 0 0 |
| 8 | 1 1 1 0 0 0 1 |
| ... | ... |
| 255 | |
| binIdx | 0 1 2 3 4 5 6 | b. Furthermore, in one example, the first N bins may be coded using one context model, i.e., the same context model for each of the first N leading bins, and the remaining bins in the bin string are bypass coded. N may be a non-negative integer number. In one example, N may be set to be equal to 9. Accordingly, with this binarization, entropy encoding unit 118 and entropy decoding unit 150 code no more than the first N bins with a context model, and bypass code any remaining bins that are not context coded. Moreover, entropy encoding unit 118 and entropy decoding unit 150 code all of the context coded bins, up to the limit of N, with the same context model. In some examples, all N bins, if available, are coded with the same context model. In other examples, a subset of the N bins, less than all N bins, to the extent available, are coded with the same context model, and any remaining bins are bypass coded.

c. Alternatively, only the first '0' bin and bins before it (i.e., before the '0' bin) are coded using context model(s). For example, any bins leading up to the first zero-valued bin ('0' bin), and the zero-valued bin itself, are coded using one or more context models, and any remaining bins after the zero-valued bin are bypass coded.

i. In this example, the leading consecutive '1' bins and the following first '0' bin (such as, for example, those bins highlighted in bold and underlined in Table 5 above) are coded using one or more context models. Bins after the first '0' bin are bypass coded. Hence, as an illustration, if the binarization for inter_sdc_resi_abs_minus1 or depth_dc_abs is 1110001, entropy encoding unit 118 or entropy decoding unit 150 may entropy code the first three '1' bins and the first '0' bin using one or more context models and then bypass code the last '0,' '0,' and '1' bins without using context models.

ii. In addition, in one example, entropy coding may be configured so that only the first N bins before the first '0' (including the first '0') are coded with one or more context models, and the remaining bins are bypass coded. In this case, if there are more than N leading '1' bins before the first '0' bin, only the first N leading bins will be coded with a context model, and the remaining bins are bypass coded.

As an illustration, if N=9, and there are eight leading '1' bins before the first '0' bin, then the eight leading bins plus the first '0' bin will be coded with one or more context models, and the remaining bins will be bypass coded. If N=9, and there are nine leading '1' bins before the first '0' bin, then only the first nine leading '1' bins will be coded with one or more context models, and the remaining bins, including the first '0' bin, will be bypass coded. As a further illustration, if N=9, and there are six leading '1' bins before the first '0' bin, then only the first six leading '1' bins and the '0' bin will be coded with one or more context models, and the remaining bins will be bypass coded.

Hence, in some examples, this feature may be used in conjunction with limiting context coding to no more than the first N leading bins for a delta DC value syntax element, e.g., as described above with reference to item 1. Accordingly, entropy encoding unit 118 and entropy decoding unit 150 may be configured to code no more than the first N leading bins, and no more than the first leading bins up to and including the first '0' bin, using one or more context models, and bypass code any remaining bins of the syntax element.

d. In addition, in some examples, one or both of the syntax elements inter_sdc_resi_abs_minus1 and depth_dc_abs may be restricted to be in the range [0, 2^((N+1)/2)−2] to make sure that it is binarized into no more than N bins. In one example, k is equal to 0, N is equal to 9 and the range is [0, 30]. In this case, for inter SDC mode, the range of delta DC is the union of [−31, −1] and [1, 31]; for intra SDC mode and DMM mode, when there is only one partition in a current prediction unit, the range of delta DC is [−31, 31], and when there are two partitions in current prediction unit, the range of delta DC is [−30, 30]. In this manner, the values of the inter_sdc_resi_abs_minus1 and depth_dc_abs syntax element may be clipped to limit the number of bins that are produced in the binarization.

Figure 7:
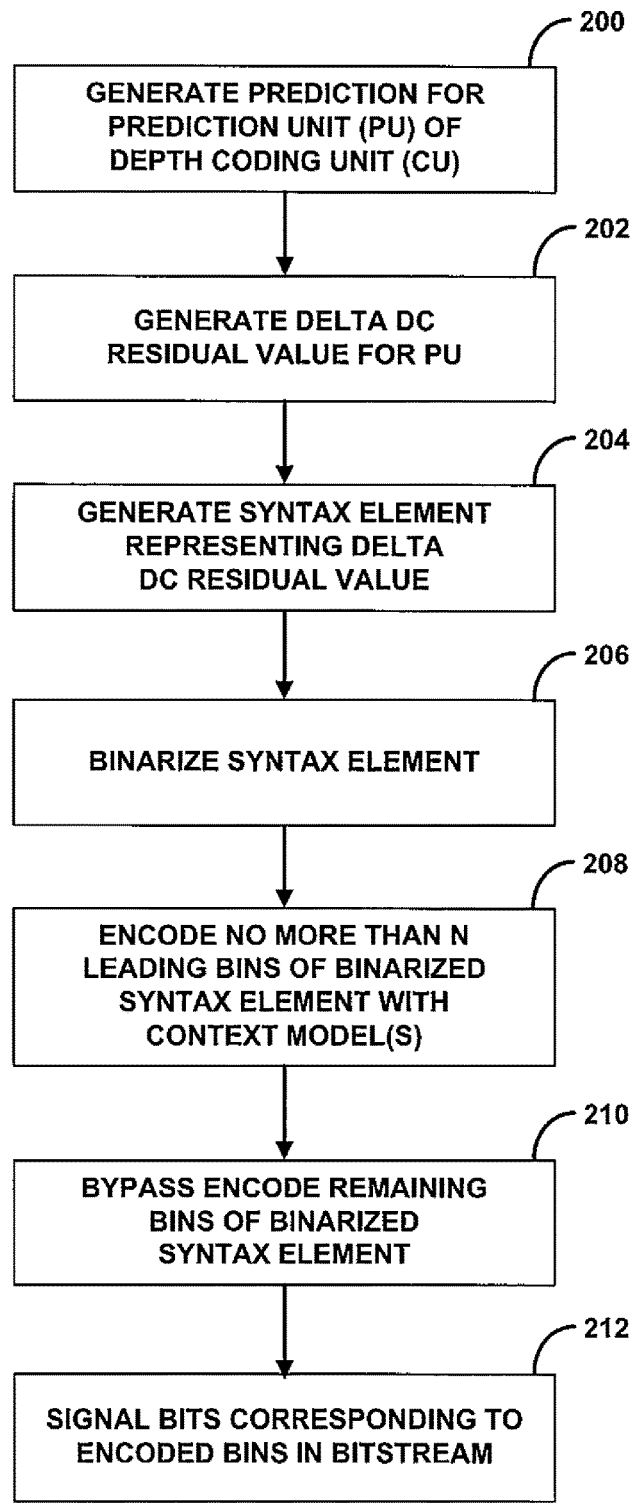
FIG. 7 is a flow diagram illustrating a method for encoding a syntax element representing a delta DC residual value.

FIG. 7 is a flow diagram illustrating a method for encoding a syntax element representing a delta DC residual value. Entropy coding aspects of the method of FIG. 7 may be performed by entropy encoding unit 118 of video encoder 20. As shown in FIG. 7, video encoder 20 may generate a prediction for a PU or PU partition of a depth CU (200). The prediction may include intra- or inter-predicted samples for the pixels of the PU or partition. A PU partition may include, for example, a wedgelet or contour partition. Encoder 20 may perform the prediction using an HEVC intra-prediction mode, DMM, or inter-prediction. In this example, encoder 20, e.g., in prediction processing unit, uses SDC or DMM (with or without SDC) to generate a delta DC residual value for the PU or PU partition (202). Encoder 20, e.g., in prediction processing unit 120, generates a syntax element representing the delta DC residual value (204), e.g., inter_sdc_resi_abs_minus1 or depth_dc_abs. Entropy encoding unit 118 binarizes the syntax element (206), e.g., using any of the binarization processes described in this disclosure.

Entropy encoding unit 118 encodes no more than N leading bins of the bin string of the binarized syntax element using one or more context models (208), where N is less than a maximum possible number of bins for the syntax element. In particular, entropy encoding unit 118 encodes no more than N leading bins with a regular coding engine of a CABAC coder. In addition, entropy encoding unit 118 bypass encodes any remaining bins of the binarized syntax element (210), and signals bits corresponding to the encoded bins in an encoded video bitstream (212). In some cases, there are no remaining bins that are not context coded, depending on the value of the syntax element, or depending on the number of bins that are context coded, subject to the maximum of N leading bins. By restricting context coding to no more than N leading bins, where N is less than a maximum possible number of bins, and bypass coding other bins, entropy coding can be simplified. In some examples, limiting context coding to no more than N leading bins may be applied by modifications to context modeling, the binarization process, or both, e.g., as described above.

Video encoder 20, e.g., via components such as prediction processing unit 120 and entropy encoding unit 118, may include one or more processors configured to perform a method of encoding video data, as shown in FIG. 7. For example, video encoder 20 may generate a syntax element that represents a delta DC residual value for a prediction unit (PU) of a depth coding unit (CU), and binarize the syntax element into a string of bins. The syntax element may represent the delta DC residual value for a partition of one or more partitions of the PU.

The syntax element may be, for example, an inter_sdc_resi_abs_minus1 or depth_dc_abs syntax element, as defined in 3D-HEVC, or any similar syntax element that represents a delta DC residual value. Video encoder 20 may encode no more than N leading bins of the binarized syntax element using one or more context models, wherein N is less than a maximum possible number of the bins of the binarized syntax element, and bypass encode any remaining bins of the binarized syntax element that were not encoded using one or more context models. In these examples and other examples, N may be a positive integer. Encoding no more than N leading bins may comprise encoding the no more than N leading bins using a regular coding engine of a context adaptive binary arithmetic coding (CABAC) entropy coder, and bypass encoding the remaining bins may comprise bypass encoding the remaining bins using a bypass coding engine of the CABAC entropy coder. Video encoder 20 may signal bits corresponding to the encoded bins in an encoded bitstream.

In one example, video encoder 20 may binarize a value of the syntax element using a concatenation of a prefix bin string binarized with a Truncated Rice (TR) code, with cRiceParam=0, and a suffix bin string binarized with a $0^{th}$ order exponential Golomb (EG0) code, and wherein a cMax value of the TR code is equal to N, to produce the bins. In another example, video encoder 20 may binarize a value of the syntax element using a concatenation of a prefix bin string binarized with a Truncated Rice (TR) code, with cRiceParam=0, and a suffix bin string binarized with a $k^{th}$ order exponential Golomb (EGk) code, wherein k is non-zero, and wherein a cMax value of the TR code is equal to N, to produce the bins. In another example, video encoder 20 may binarize a value of the syntax element using a concatenation of a prefix bin string binarized with a Truncated Rice (TR) code, with cRiceParam=0, and a suffix bin string binarized with a fixed length code, to produce the bins. For any of the above binarizations, when a value of the syntax element is smaller than the cMax value, the suffix bin string is not produced by the binarization.

In another example, video encoder 20 binarizes a value of the syntax element is binarized using a $k^{th}$ order exponential Golomb (EGk) code to produce the bins. The value of k may be equal to, e.g., 0. In this example, encoding no more than N bins by video encoder 20 may comprise, when a first bin having a zero value is positioned within the N leading bins of the syntax element, encoding only the first bin having the zero value and any leading bins before the first bin having the zero value using one or more context models and, when the first bin having a zero value is not positioned within the N leading bins of the syntax element, encoding only the leading N bins using one or more context models.

In some examples, video encoder 20 may generate a predicted partition for a partition of the PU, which may be single partition or one of multiple partitions of the PU. The delta DC residual value indicates a difference between an average pixel value of the partition and an average pixel value (i.e., predicted sample value) of the predicted partition. If the predicted partition is intra-predicted, the syntax element may be a depth_dc_abs syntax element, e.g., as provided by 3D-HEVC to represent a delta DC residual value for intra-coding. If the predicted partition is inter-predicted, the syntax element may be an inter_sdc_resi_abs_minus1 syntax element as provided by 3D-HEVC to represent a delta DC residual value for inter-coding.

In one example, video encoder 20 may generate a flag or other syntax element having a first value indicating that no more than the N leading bins are encoded using the one or more context models, and a second value indicating that more than the N leading bins may be encoded using the one or more context models, i.e., that there is not a limit on the number of context-coded bins. Hence, in some examples, video encoder 20 may signal information to cause video decoder 30 to limit context coding to no more than the N leading bins, or to not limit context coding to the N leading bins.

In some examples, video encoder 20 may encode the no more than N leading bins of the syntax element using the same context model. Alternatively, video encoder 20 may encode at least some of the no more than N leading bins of the syntax element using different context models. As a further alternative, video encoder 30 may be configured to encode a leading M of the no more than N leading bins of the syntax element using the same context model, where M is less than N, and encode remaining bins, if any, after the M leading bins using bypass coding.

In some examples, video encoder 20 may be configured to clip a value of the syntax element (e.g., inter_sdc_resi_abs_minus 1 for inter coding or depth_dc_abs for intra coding) to a range that is less than a full range of the value. In this case, the bins may be produced by binarization of the clipped value. As an example, video encoder 20 may clip the value of the syntax element such that binarization produces no more than 9 bins.

Figure 8:
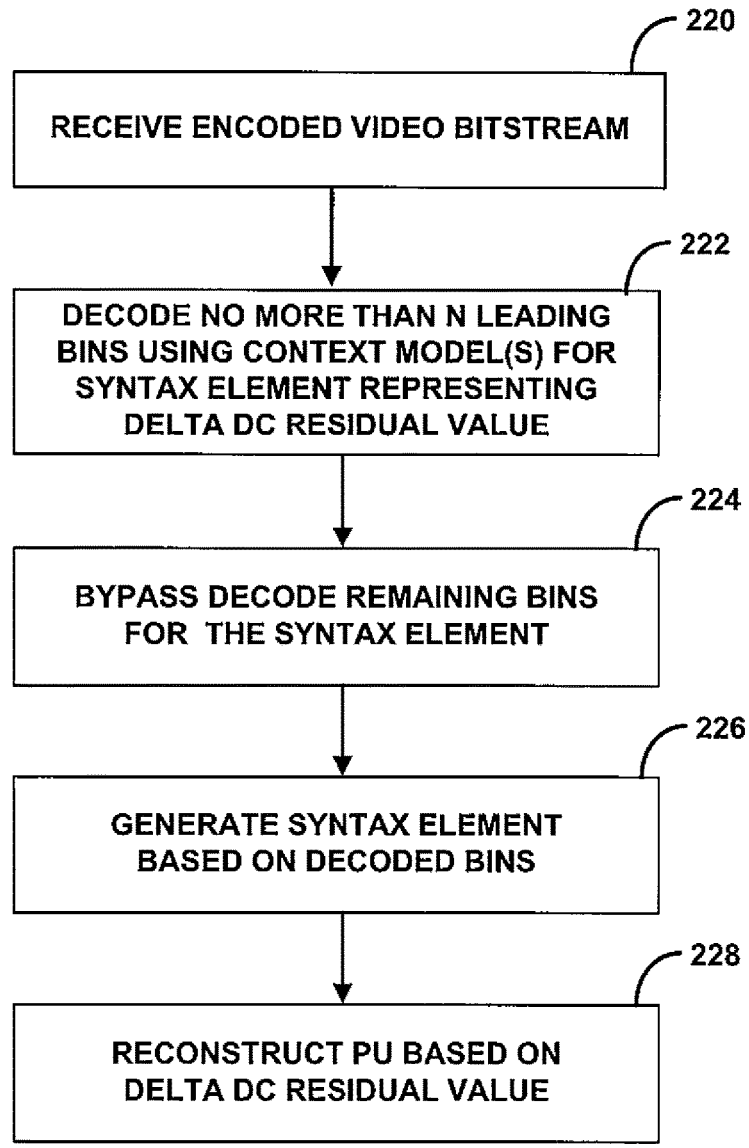
FIG. 8 is a flow diagram illustrating a method for decoding a syntax element representing a delta DC residual value.

FIG. 8 is a flow diagram illustrating a method for decoding a syntax element representing a delta DC residual value. Entropy coding aspects of the method of FIG. 8 may be performed by entropy decoding unit 150 of video decoder 30. As shown in FIG. 8, entropy decoding unit 150 receives an encoded video bitstream (220) and decodes no more than N leading bins from the bitstream, for a syntax element representing a delta DC residual value for a PU, using one or more context model(s) (222). The value of N is less than a maximum possible number of bins for the syntax element. Entropy decoding unit 150 bypass decodes any remaining bins for the syntax element without using context models (224). Entropy decoding unit 150 generates the syntax element based on the decoded bins (226). Video decoder 30, e.g., in reconstruction unit 158, reconstructs an inter-coded or intra-coded PU based on the delta DC residual value represented by the syntax element and inter-predicted samples or intra-predicted samples of the PU or partition (228).

Video decoder 30, e.g., via components such as entropy encoding unit 150, prediction processing unit 152, and reconstruction unit 158, may include one or more processors configured to perform a method of decoding video data, as shown in FIG. 8. For example, video decoder 30 may be configured to receive an encoded video bitstream, and decode bins from the bitstream for a syntax element that represents a delta DC residual value (e.g., inter_sdc_resi_abs_minus1 for inter coding or depth_dc_abs for intra coding) for a prediction unit (PU) of a depth coding unit (CU).

To decode the bins, video decoder 30 may decode no more than N leading bins for the syntax element using one or more context models, wherein N is less than a maximum possible number of the bins for the syntax element. In addition, video decoder 30 may bypass decode any remaining bins for the syntax element that were not decoded using one or more context models. Decoding no more than N leading bins may comprise decoding the no more than N leading bins using a regular decoding engine of a context adaptive binary arithmetic coding (CABAC) entropy coder, and bypass decoding the remaining bins may comprise bypass decoding the remaining bins using a bypass decoding engine of the CABAC entropy coder.

Video decoder 30 may generate the syntax element based on the decoded bins, and reconstruct the PU based at least in part on the delta DC residual value represented by the syntax element. The syntax element (e.g., inter_sdc_resi_abs_minus1 for inter coding or depth_dc_abs for intra coding) may represent the delta DC residual value for a partition of one or more partitions of the PU. The PU may be reconstructed based at least in part on the delta DC residual value and predicted samples of the partition. When the predicted partition is intra-predicted, the syntax element comprises a depth_dc_abs syntax element. When the predicted partition is inter-predicted, the syntax element comprises an inter_sdc_resi_abs_minus1 syntax element. In either case, the delta DC residual value indicates a difference between an average pixel value of the partition and an average pixel value of the predicted partition.

As described above with reference to the operation of video encoder 20, video decoder 30 may be configured to decode bins that are produced by a binarization of the syntax element as follows. For example, a value of the syntax element may be binarized using a concatenation of a prefix bin string binarized with a Truncated Rice (TR) code, with cRiceParam=0, and a suffix bin string binarized with a $0^{th}$ order exponential Golomb (EG0) code, and wherein a cMax value of the TR code is equal to N, to produce the bins. In another example, a value of the syntax element may be binarized using a concatenation of a prefix bin string binarized with a Truncated Rice (TR) code, with cRiceParam=0, and a suffix bin string binarized with a $k^{th}$ order exponential Golomb (EGk) code, wherein k is nonzero, and wherein a cMax value of the TR code is equal to N, to produce the bins. In another example, a value of the syntax element may be binarized using a concatenation of a prefix bin string binarized with a Truncated Rice (TR) code, with cRiceParam=0, and a suffix bin string binarized with a fixed length code, to produce the bins. When a value of the syntax element is smaller than the cMax value, the suffix bin string is not produced by the binarization.

As another example, the value of the syntax element may be binarized using a $k^{th}$ order exponential Golomb (EGk) code to produce the bins. In some examples, k=0. In decoding no more than N bins, video decoder 30 may, when a first bin having a zero value is positioned within the N leading bins of the syntax element, decode only the first bin having the zero value and any leading bins before the first bin having the zero value using one or more context models. When the first bin having a zero value is not positioned within the N leading bins of the syntax element, video decoder 30 may decode only the leading N bins using one or more context models.

In some examples, video decoder 30 may receive a flag or other syntax information, and decode no more than the N leading bins using the one or more context models when the flag or other syntax information has a first value. When the flag or other syntax information has a second value, video decoder 30 may decode more than the N leading bins using the one or more context models when the flag has a second value. For example, when the flag or other syntax information has the second value, there is not a limit on the number of bins that are coded with one or more context models.

Video decoder 30 may be configured, in some examples, to decode the no more than N leading bins of the syntax element using the same context model. Alternatively, video decoder 30 may decode at least some of the no more than N leading bins of the syntax element using different context models. As a further alternative, video decoder 30 may decode a leading M of the no more than N leading bins of the syntax element using the same context model, where M is less than N, and decode remaining bins, if any, after the M leading bins using bypass coding.

In some examples, a value of the syntax element is clipped to a range that is less than a full range of the value, and the bins are produced by binarization of the clipped value. For example, the value of the syntax element may be clipped such that binarization produces no more than 9 bins.

The various regular and bypass CABAC coding techniques described in this disclosure may be performed by video encoder 20 (FIGS. 1 and 5) and/or video decoder 30 (FIGS. 1 and 6), both of which may be generally referred to as a video coder. In addition, video coding may generally refer to video encoding and/or video decoding, as applicable.

While the techniques of this disclosure are generally described with respect to 3D-HEVC, the techniques are not limited in this way. The techniques described above may also be applicable to other current standards or future standards for 3D video coding. For example, the techniques described in this disclosure for entropy coding, including binarization, may also be applicable to other current or future standards involving delta DC coding for depth partitions, e.g., for 3D video coding or other applications.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of video decoding, the method comprising:
receiving an encoded video bitstream;
decoding a plurality of bins from the bitstream for a syntax element that represents a delta DC residual value for a depth block, wherein a value of the syntax element is binarized as a concatenation of a prefix bin string binarized with a Truncated Rice (TR) code, with cRiceParam=0 and, if available, a suffix bin string binarized with a 0th order exponential Golomb (EG0) code, and wherein decoding comprises:
determining that a cMax value of the TR code is equal to N, wherein N represents an integer value that is less than a predetermined maximum number of the bins for the syntax element,
decoding no more than the N number of leading bins of the plurality of bins for the syntax element using respective instances of a single context model, and
decoding, according to a bypass mode, any remaining bins for the syntax element that were not decoded using the respective instances of the single context model;
generating the syntax element based on the decoded bins; and
reconstructing the depth block based at least in part on the delta DC residual value represented by the generated syntax element.

2. The method of claim 1, wherein the integer value represented by N is equal to three (3).

3. The method of claim 1, wherein the syntax element represents the delta DC residual value for a partition of one or more partitions of the depth block.

4. The method of claim 3, wherein reconstructing the depth block comprises reconstructing the partition based at least in part on the delta DC residual value and a predicted partition.

5. The method of claim 4, wherein the predicted partition is intra-predicted and the syntax element comprises a depth_dc_abs syntax element.

6. The method of claim 4, wherein the predicted partition is inter-predicted and the syntax element comprises an inter_sdc_resi_abs_minus1 syntax element.

7. The method of claim 4, wherein the delta DC residual value indicates a difference between an average pixel value of the partition and an average pixel value of the predicted partition.

8. The method of claim 1, further comprising:
receiving a flag in the encoded video bitstream; and
decoding no more than the N number of leading bins using the respective instances of the single context model based on a determination that the flag is set to a first value of two possible values for the flag.

9. The method of claim 1, further comprising:
decoding a leading M bins of the no more than the N number of leading bins of the syntax element using the respective instances of the single context model, wherein M represents an integer value less than the integer value represented by N,
wherein decoding, according to the bypass mode, any remaining bins comprises decoding any remaining bins after the leading M bins according to the bypass mode.

10. The method of claim 1, wherein the value of the syntax element is clipped to a range that is less than a full range of the value, and wherein the bins are produced by binarization of the clipped value.

11. The method of claim 10, wherein the value of the syntax element is clipped such that the binarization of the syntax element produces no more than the N number of leading bins.

12. The method of claim 11, wherein decoding the no more than N leading bins comprises:
  decoding the no more than N leading bins using a regular coding engine of a context adaptive binary arithmetic coding (CABAC) entropy coder, and
  wherein decoding, according to the bypass mode, comprises decoding the remaining bins using a bypass coding engine of the CABAC entropy coder to decode the any remaining bins according to the bypass mode.

13. A method of encoding video data, the method comprising:
  generating a syntax element that represents a delta DC residual value for a depth block;
  binarizing a value of the syntax element using a concatenation of a prefix bin string binarized with a Truncated Rice (TR) code, with cRiceParam=0 and, if available, a suffix bin string binarized with a 0th order exponential Golomb (EG0) code, to produce bins of the binarized syntax element;
  determining that a cMax value of the TR code is equal to N, wherein N represents an integer value that is less than a predetermined maximum number of the bins of the binarized syntax element;
  encoding no more than the N number of leading bins of the plurality of bins for the binarized syntax element using respective instances of a single context model;
  encoding, according to a bypass mode, any remaining bins of the binarized syntax element that were not encoded using the respective instances of the single context model; and
  signaling bits corresponding to the encoded bins in an encoded bitstream.

14. The method of claim 13, wherein the integer value represented by N is equal to three (3).

15. The method of claim 13, wherein the syntax element represents the delta DC residual value for a partition of one or more partitions of the depth block.

16. The method of claim 15, further comprising generating a predicted partition for the partition of the depth block, wherein the delta DC residual value indicates a difference between an average pixel value of the partition and an average pixel value of the predicted partition.

17. The method of claim 16, wherein the predicted partition is intra-predicted and the syntax element comprises a depth_dc_abs syntax element.

18. The method of claim 16, wherein the predicted partition is inter-predicted and the syntax element comprises an inter_sdc_resi_abs_minus1 syntax element.

19. The method of claim 13, further comprising generating a flag by setting the flag to a first value of two possible values to indicate that no more than the N number of leading bins are encoded using the respective instances of the single context model.

20. The method of claim 13, further comprising:
  encoding a leading M bins of the no more than the N number leading bins of the syntax element using the respective instances of the single context model, wherein M represents an integer value less than the integer value represented by N,
  wherein encoding, according to the bypass mode, any remaining bins comprises encoding any remaining bins after the leading M bins according to the bypass mode.

21. The method of claim 13, further comprising clipping the value of the syntax element to a range that is less than a full range of the value, wherein the bins are produced by binarization of the clipped value.

22. The method of claim 21, further comprising clipping the value of the syntax element such that the binarization of the syntax element produces no more than the N number of leading bins.

23. The method of claim 22, wherein encoding the no more than the N number of leading bins comprises:
  encoding the no more than the N number of leading bins using a regular coding engine of a context adaptive binary arithmetic coding (CABAC) entropy coder, and
  wherein encoding, according to the bypass mode, comprises encoding the remaining bins using a bypass coding engine of the CABAC entropy coder to encode the any remaining bins according to the bypass mode.

24. A video coding device comprising:
  a memory storing a coded video bitstream, wherein the bitstream includes a syntax element that represents a delta DC residual value for a depth block, wherein a value of the syntax element is binarized as a concatenation of a prefix bin string binarized with a Truncated Rice (TR) code, with cRiceParam=0 and, if available, a suffix bin string binarized with a 0th order exponential Golomb (EG0) code; and
  one or more processors in communication with the memory, the one or more processors being configured to:
    determine that a cMax value of the TR code is equal to N, wherein N represents an integer value that is less than a predetermined maximum number of the bins for the syntax element;
    code no more than the N umber of leading bins of the plurality of bins for the syntax element stored to the memory using respective instances of a single context model; and
    code, according to a bypass mode, any remaining bins of the syntax element that were not coded using the respective instances of the single context model.

25. The device of claim 24, wherein the video coding device comprises a video decoding device, wherein the coded video bitstream is an encoded video bitstream, and wherein the one or more processors are further configured to:
  decode the encoded video bitstream to generate the bins;
  generate the syntax element based on the decoded bins; and
  reconstruct the depth block based at least in part on the delta DC residual value represented by the generated syntax element.

26. The device of claim 24, wherein the video coding device comprises a video encoding device, and wherein the one or more processors are further configured to:
  binarize the syntax element to generate the bins; and
  signal bits corresponding to the encoded bins in the coded video bitstream.

27. The device of claim 26, wherein the integer value represented by N is equal to three (3).

28. The device of claim 24, wherein the syntax element represents the delta DC residual value for a partition of one or more partitions of the depth block, and the one or more processors are configured to predict the partition, wherein the delta DC residual value indicates a difference between an average pixel value of the partition and an average pixel value of the predicted partition.

29. The device of claim 28, wherein the device is a video decoding device, and the one or more processors are further configured to reconstruct the depth block based at least in part on the delta DC residual value represented by the syntax element, wherein reconstruction of the depth block comprises reconstruction of the partition based at least in part on the delta DC residual value and the predicted partition.

30. The device of claim 28, wherein the predicted partition is intra-predicted and the syntax element comprises a depth_dc_abs syntax element.

31. The device of claim 28, wherein the predicted partition is inter-predicted and the syntax element comprises an inter_sdc_resi_abs_minus1 syntax element.

32. The device of claim 28, wherein the delta DC residual value indicates a difference between an average pixel value of the partition and an average pixel value of the predicted partition.

33. The device of claim 32, wherein the one or more processors are further configured to code:
a flag included in the coded video bitstream; and
determine that the flag is set to a first value of two possible values to indicate that no more than the N number of leading bins are coded using the respective instances of the single context model.

34. The device of claim 24, wherein the one or more processors are further configured to:
code a leading M bins of the no more than the N number of leading bins of the syntax element using the respective instances of the single context model, wherein M represents an integer value that is less than the integer value represented by N, wherein to code, according to the bypass mode, any remaining bins, the one or more processors are configured to code any remaining bins after the leading M bins according to the bypass mode.

35. The device of claim 24, wherein the value of the syntax element is clipped to a range that is less than a full range of the value, and wherein the bins are produced by binarization of the clipped value.

36. The device of claim 35, wherein the value of the syntax element is clipped such that the binarization of the syntax element produces no more than the N number of leading bins.

37. The device of claim 36, wherein the one or more processors are configured to:
code the no more than the N number of leading bins using a regular coding engine of a context adaptive binary arithmetic coding (CABAC) entropy coder; and
use a bypass coding engine of the CABAC entropy coder to code the any remaining bins according to the bypass mode.

38. A video coding device comprising:
means for storing a coded video bitstream, wherein the bitstream includes a syntax element that represents a delta DC residual value for a depth block, wherein a value of the syntax element is binarized as a concatenation of a prefix bin string binarized with a Truncated Rice (TR) code, with cRiceParam=0 and, if available, a suffix bin string binarized with a 0th order exponential Golomb (EG0) code;
means for determining that a cMax value of the TR code is equal to N, wherein N represents an integer value that is less than a predetermined maximum number of the bins for the syntax element;
means for coding no more than the N number of leading bins of the plurality of bins for the syntax element using respective instances of a single context model, and
means for coding, according to a bypass mode, any remaining bins of the syntax element that were not coded using the respective instances of the single context model.

39. A non-transitory computer-readable storage medium comprising instructions that, when executed, cause one or more processors of a video coding device to:
store a coded video bitstream, wherein the bitstream includes a syntax element that represents a delta DC residual value for a depth block, wherein a value of the syntax element is binarized as a concatenation of a prefix bin string binarized with a Truncated Rice (TR) code, with cRiceParam=0 and, if available, a suffix bin string binarized with a 0th order exponential Golomb (EG0) code;
determine that a cMax value of the TR code is equal to N, wherein N represents an integer value that is less than a predetermined maximum number of the bins for the syntax element;
code no more than the N number of leading bins of the plurality of bins for the syntax element using respective instances of a single context model, and
code, according to a bypass mode, any remaining bins of the syntax element that were not coded using the respective instances of the single context model.

40. The non-transitory computer-readable storage medium of claim 39, wherein the integer value represented by N is equal to three (3).

41. The video coding device of claim 38, wherein the integer value represented by N is equal to three (3).

42. The method of claim 1, wherein decoding any remaining bins of the syntax element according to the bypass mode comprises:
determining that the suffix bin string is available; and
based on the determination that the suffix bin string is available, decoding the suffix bin string according to the bypass mode.

43. The method of claim 13, wherein encoding any remaining bins of the syntax element according to the bypass mode comprises:
determining that the suffix bin string is available; and
based on the determination that the suffix bin string is available, encoding the suffix bin string according to the bypass mode.

44. The device of claim 24, wherein to code any remaining bins of the syntax element according to the bypass mode, the one or more processors are further configured to:
determine that the suffix bin string is available; and
based on the determination that the suffix bin string is available, code the suffix bin string according to the bypass mode.

* * * * *